United States Patent
Huffer

(10) Patent No.: US 11,912,004 B2
(45) Date of Patent: Feb. 27, 2024

(54) FLEXIBLE PACKAGING STRUCTURE WITH INTEGRAL TAMPER-EVIDENCE FEATURES AND METHOD FOR MAKING THE SAME

(71) Applicant: Sonoco Development Inc., Hartsville, SC (US)

(72) Inventor: Scott William Huffer, Hartsville, SC (US)

(73) Assignee: SONOCO DEVELOPMENT, INC., Hartsville, SC (US)

( * ) Notice: Subject to any disclaimer, the term of this patent is extended or adjusted under 35 U.S.C. 154(b) by 505 days.

(21) Appl. No.: 17/031,154

(22) Filed: Sep. 24, 2020

(65) Prior Publication Data

US 2022/0088897 A1    Mar. 24, 2022

(51) Int. Cl.
*B32B 3/26* (2006.01)
*C09J 7/38* (2018.01)
(Continued)

(52) U.S. Cl.
CPC ............... *B32B 3/266* (2013.01); *B32B 3/06* (2013.01); *B32B 7/12* (2013.01); *B32B 27/08* (2013.01); *B32B 27/32* (2013.01); *B32B 27/36* (2013.01); *C09J 7/38* (2018.01); *B32B 2250/02* (2013.01); *B32B 2250/03* (2013.01); *B32B 2250/24* (2013.01); *B32B 2250/40* (2013.01);
(Continued)

(58) Field of Classification Search
CPC .. B32B 3/266; B32B 3/06; B32B 7/12; B32B 27/08; B32B 27/32; B32B 27/36; B32B 2250/02; B32B 2250/03; B32B 2250/24; B32B 2250/40; B32B 2307/582; B32B 2323/10; B32B 2367/00; B32B 2553/00; C09J 7/38
See application file for complete search history.

(56) References Cited

U.S. PATENT DOCUMENTS

| | | | | |
|---|---|---|---|---|
| 7,963,413 B2 * | 6/2011 | Sierra-Gomez | .... | B65D 75/5855 383/203 |
| 9,656,783 B2 | 5/2017 | Lyzenga et al. | | |
| 9,676,537 B2 | 6/2017 | Fenech, III et al. | | |

(Continued)

OTHER PUBLICATIONS

International Search Report and Written Opinion for International application No. PCT/US2021/045303 dated Dec. 14, 2021; 15 pages.

*Primary Examiner* — Travis M Figg
(74) *Attorney, Agent, or Firm* — Nelson Mullins Riley & Scarborough LLP

(57) ABSTRACT

A flexible laminate, packaging structure and method comprising an outer structure, an inner structure, and a pressure sensitive adhesive layer adhesively joining the outer and inner structures to form a laminate. At least one outer line of weakness is formed in the outer structure, wherein the at least one outer line of weakness terminates in at least one tear receiving element adjacent an opening end of the laminate. A tab is defined by at least one line of weakness formed through both the outer structure and the inner structure, wherein the at least one tab line of weakness terminates in at least one tear propagating element. A second inner line of weakness is formed in the inner structure, wherein the second inner line of weakness is disposed between the at least one tear propagating element of the tab and the at least one tear receiving element of the at least one outer line of weakness.

24 Claims, 16 Drawing Sheets

US 11,912,004 B2
Page 2

(51) Int. Cl.
  *B32B 3/06* (2006.01)
  *B32B 7/12* (2006.01)
  *B32B 27/08* (2006.01)
  *B32B 27/32* (2006.01)
  *B32B 27/36* (2006.01)
(52) U.S. Cl.
  CPC ..... *B32B 2307/582* (2013.01); *B32B 2323/10* (2013.01); *B32B 2367/00* (2013.01); *B32B 2553/00* (2013.01)

(56) References Cited

U.S. PATENT DOCUMENTS

| | | | |
|---|---|---|---|
| 10,273,068 B2 | 4/2019 | Branyon et al. | |
| 2002/0146525 A1* | 10/2002 | Huffer | B32B 7/12 428/513 |
| 2005/0276525 A1* | 12/2005 | Hebert | B31B 70/74 383/203 |
| 2006/0171611 A1* | 8/2006 | Rapparini | B65D 75/5838 383/203 |
| 2010/0018974 A1* | 1/2010 | Lyzenga | B65D 43/0235 220/214 |
| 2010/0092112 A1* | 4/2010 | Goglio | B65D 75/5894 383/210 |
| 2011/0195209 A1* | 8/2011 | Bosman | B32B 7/12 156/60 |
| 2012/0048857 A1* | 3/2012 | Bando | B32B 7/12 220/260 |
| 2013/0233879 A1* | 9/2013 | Thimmesch | B65D 33/00 383/7 |
| 2014/0000219 A1* | 1/2014 | Pezzoli | B65B 51/02 383/203 |
| 2015/0307264 A1* | 10/2015 | Boswell | B65D 85/70 383/116 |
| 2017/0137196 A1 | 5/2017 | Tinoco et al. | |
| 2018/0071974 A1 | 3/2018 | Huffer | |
| 2018/0257294 A1 | 9/2018 | Davis et al. | |
| 2019/0047266 A1 | 2/2019 | Blyth et al. | |
| 2019/0168491 A1 | 6/2019 | Blyth et al. | |
| 2019/0329954 A1* | 10/2019 | Blyth | B65D 77/2096 |
| 2019/0344946 A1* | 11/2019 | Huffer | B65D 75/30 |

\* cited by examiner

FIG. 10A  FIG. 10B  FIG. 10C
 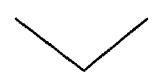 
FIG. 10D  FIG. 10E
 

FLEXIBLE PACKAGING STRUCTURE WITH INTEGRAL TAMPER-EVIDENCE FEATURES AND METHOD FOR MAKING THE SAME

BACKGROUND

The present disclosure relates in general to packaging for products, and more particularly to packaging constructed from flexible film-based materials. In an embodiment, the disclosure relates to packages having score lines that define peelable portions which create openings into to the package, pull tabs, and/or package integrity features. The invention also comprises methods for manufacturing the packaging structure.

A variety of food and non-food products are packaged using flexible packaging materials formed primarily of laminations of one or more of polymer films, metallized polymer films, paper, metal foil, and the like. In many instances, packages contain products that may be used or consumed a little at a time, and the products may be susceptible to being adversely affected (e.g., becoming soggy, drying out, etc.) by exposure to the surrounding environment. Accordingly, there is a desire to be able to reclose a package after its initial opening to keep product that remains in the package fresh.

In the existing processes for making such packages, pattern adhesives are often applied to flexible film layers and the layers are then laminated together, printed, and later scored to create the various package structural elements which allow for opening and reclose. Pattern adhesive cylinders and offline precision scoring devices are often used to create a functional opening flap for the package, a tab, and package integrity features that are each registered with the adhesive and printed material. Through ingenuity and hard work, the present inventor has developed a process which eliminates the need for pattern adhesive cylinders, pattern application of adhesives, deadened or adhesive-free tabs, and/or a separate precision scoring process (with registration) during the manufacturing process. The present disclosure addresses the above needs and achieves other advantages, by providing a flexible packaging structure and method for making same in which the structure has opening/reclose and tamper evidence features built into the structure and is manufactured more efficiently than current methods.

Further, in accordance with one embodiment of the invention, the score lines through the various film layers not only form the opening flap, but also form a unique pull tab and tamper evidence feature. In this embodiment, the pull tab may be discontinuous with the flap opening feature. When the pull tab is separated and peeled back, a portion of the film in an interrupted area is torn to connect the pull tab and the opening flap. The presence of a tear in the interrupted area indicates that the package has already been opened or tampered with.

SUMMARY

In an embodiment, the invention comprises a flexible laminate comprising an outer structure; an inner structure; a pressure sensitive adhesive layer adhesively joining the outer structure and the inner structure to form a laminate, wherein the laminate has an opening end and a base end and a longitudinal direction which runs between the opening end and the base end. The laminate has at least one outer line of weakness formed in the outer structure, the at least one outer line of weakness defining part of an outer opening portion that is separable from the outer structure along the at least one outer line of weakness, wherein the at least one outer line of weakness terminates in at least one tear receiving element adjacent the opening end of the laminate. The laminate has a first inner line of weakness formed in the inner structure, the first inner line of weakness defining an inner opening portion that is separable from the inner structure along the first inner line of weakness, wherein the inner opening portion is joined to the outer opening portion such that lifting the outer opening portion out of the plane of the flexible packaging structure causes the inner opening portion to be lifted along with the outer opening portion so as to create an opening through the flexible packaging structure and a marginal region of the outer opening portion is defined between the inner and outer lines of weakness, the marginal region overlying an underlying surface of the inner structure. The laminate also comprises a tab defined by at least one line of weakness formed through both the outer structure and the inner structure, wherein the at least one outer line of weakness terminates in at least one tear propagating element and a second inner line of weakness formed in the inner structure, wherein the second inner line of weakness is disposed between the at least one tear propagating element of the tab and the at least one tear receiving element of the at least one outer line of weakness.

In an embodiment, the invention comprises a method of making a flexible package comprising providing an outer structure; providing an inner structure; adhesively joining the outer structure and the inner structure using a pressure sensitive adhesive to form a laminate, wherein the laminate has an opening end and a base end and a longitudinal direction which runs between the opening end and the base end; scoring at least one outer line of weakness in the outer structure, the at least one outer line of weakness defining part of an outer opening portion that is separable from the outer structure along the at least one outer line of weakness, wherein the at least one outer line of weakness terminates in at least one tear receiving element adjacent the opening end of the laminate; scoring a first inner line of weakness formed in the inner structure, the first inner line of weakness defining an inner opening portion that is separable from the inner structure along the first inner line of weakness. In an embodiment, the inner opening portion is joined to the outer opening portion such that lifting the outer opening portion out of the plane of the flexible packaging structure causes the inner opening portion to be lifted along with the outer opening portion so as to create an opening through the flexible packaging structure and a marginal region of the outer opening portion is defined between the inner and outer lines of weakness, the marginal region overlying an underlying surface of the inner structure. The method may also involve scoring at least one line of weakness through both the outer structure and the inner structure to form a tab, wherein the at least one outer line of weakness terminates in at least one tear propagating element; scoring a second inner line of weakness in the inner structure, wherein the second inner line of weakness is disposed between the at least one tear propagating element of the tab and the at least one tear receiving element of the at least one outer line of weakness; and forming the scored laminate into a packaging structure having a first sidewall comprising the tab and a second sidewall, wherein the tab is disposed within an end seal region of the first sidewall; and end sealing the first sidewall to the second sidewall such that the tab remains unadhered to the second sidewall.

In yet another embodiment, the invention comprises a flexible packaging structure comprising a first sidewall and a second sidewall enclosing a product, wherein each of the first sidewall and the second sidewall comprises an outer structure; an inner structure; a pressure sensitive adhesive layer adhesively joining the outer structure and the inner structure to form a laminate, wherein the first sidewall has an opening end and a base end and a longitudinal direction which runs between the opening end and the base end; at least one outer line of weakness formed in the outer structure of the first sidewall, the at least one outer line of weakness defining part of an outer opening portion that is separable from the outer structure along the at least one outer line of weakness, wherein the at least one outer line of weakness terminates in at least one j-hook adjacent the opening end of the laminate; a first inner line of weakness formed in the inner structure of the first sidewall, the first inner line of weakness defining an inner opening portion that is separable from the inner structure along the first inner line of weakness, wherein: the inner opening portion is joined to the outer opening portion such that lifting the outer opening portion out of the plane of the flexible packaging structure causes the inner opening portion to be lifted along with the outer opening portion so as to create an opening through the flexible packaging structure; and a marginal region of the outer opening portion is defined between the inner and outer lines of weakness, the marginal region overlying an underlying surface of the inner structure; a tab defined by at least one line of weakness formed through both the outer structure and the inner structure of the first sidewall, wherein the at least one outer line of weakness terminates in at least one j-hook; and a second inner line of weakness formed in the inner structure of the first sidewall, wherein the second inner line of weakness is disposed between the at least one j-hook of the tab and the at least one j-hook of the at least one outer line of weakness.

BRIEF DESCRIPTION OF THE SEVERAL VIEWS OF THE DRAWINGS

Figure 1A:
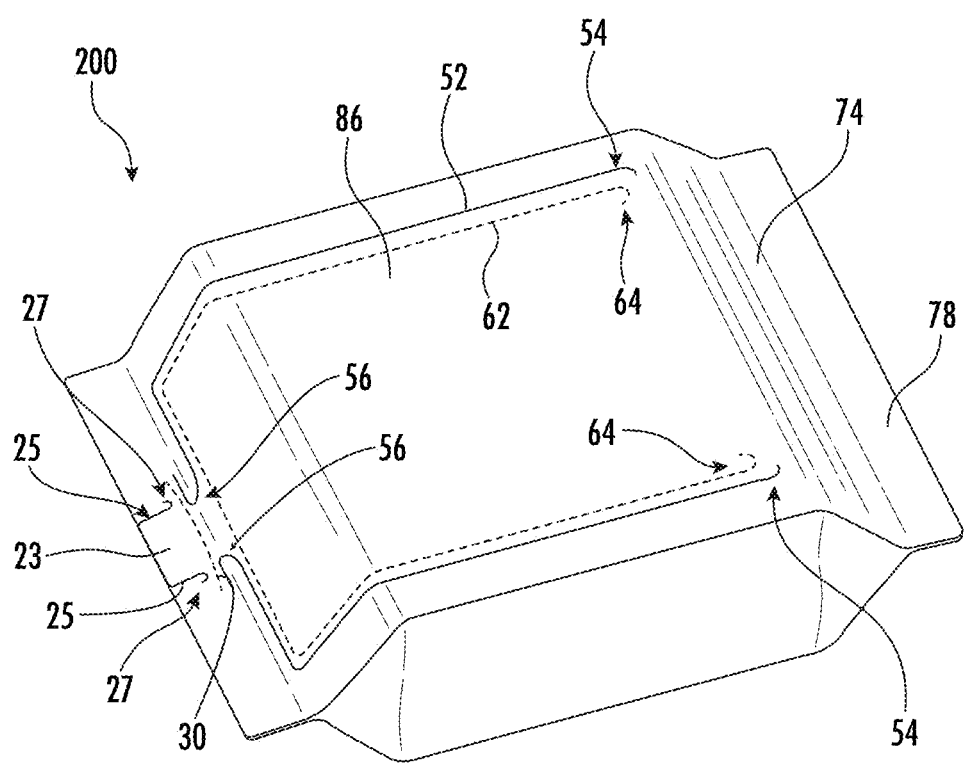
Figure 1B:
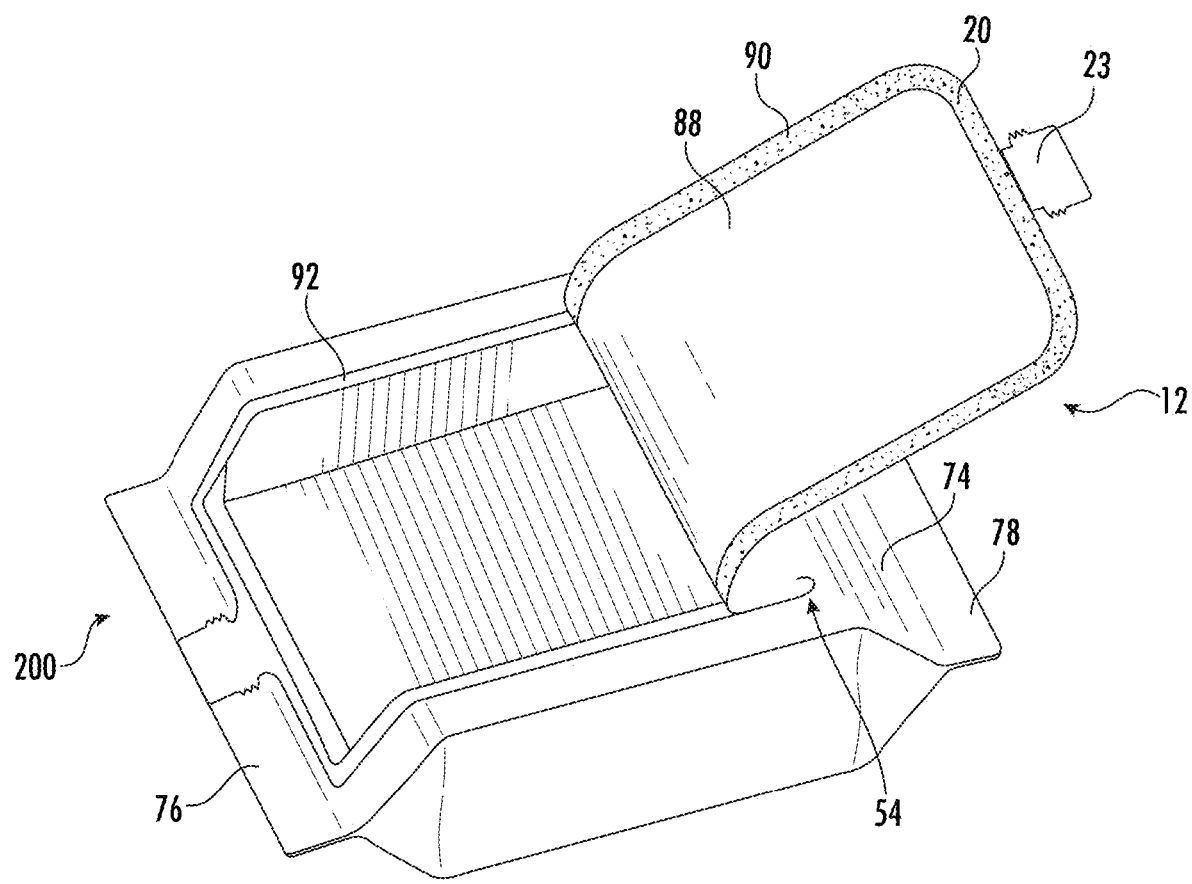
Figure 2:
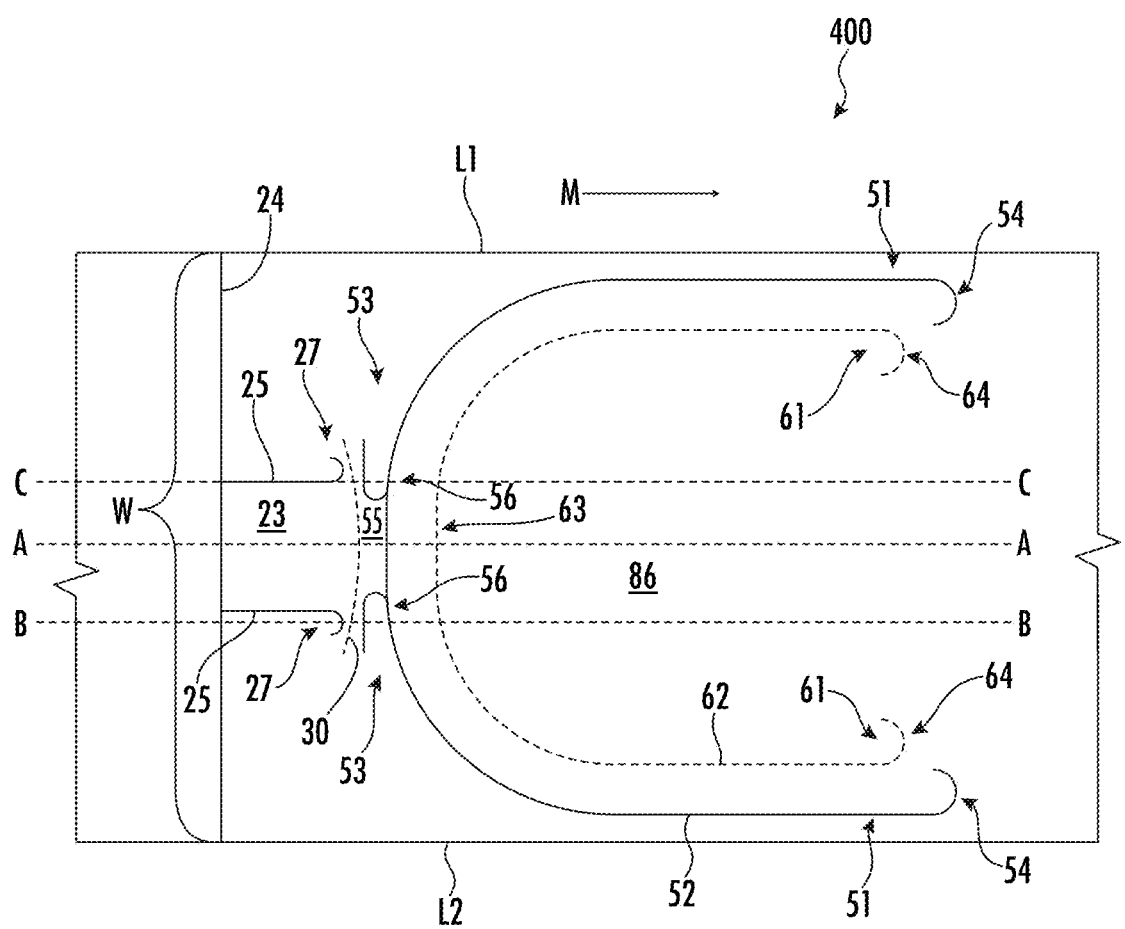
Figure 3A:
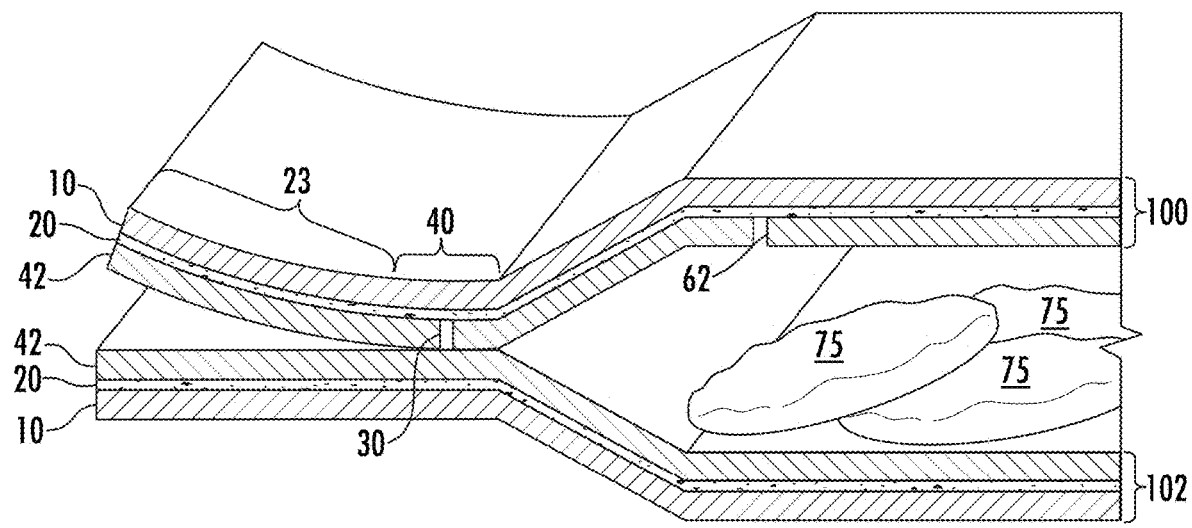
Figure 3B:
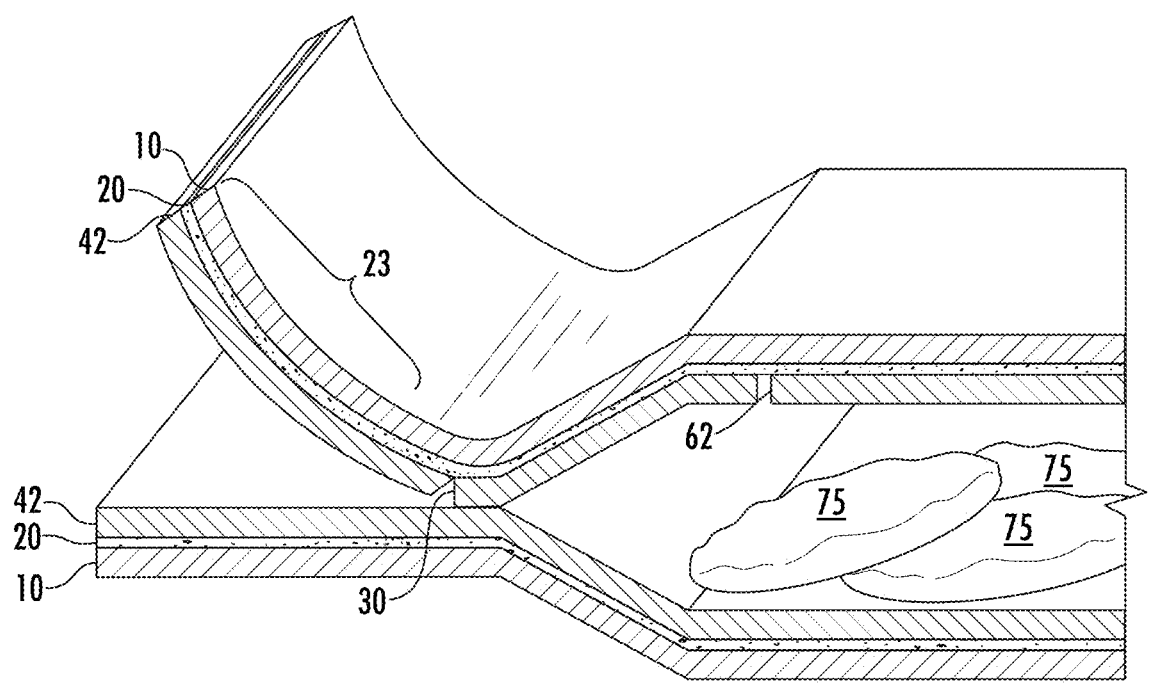
Figure 3C:
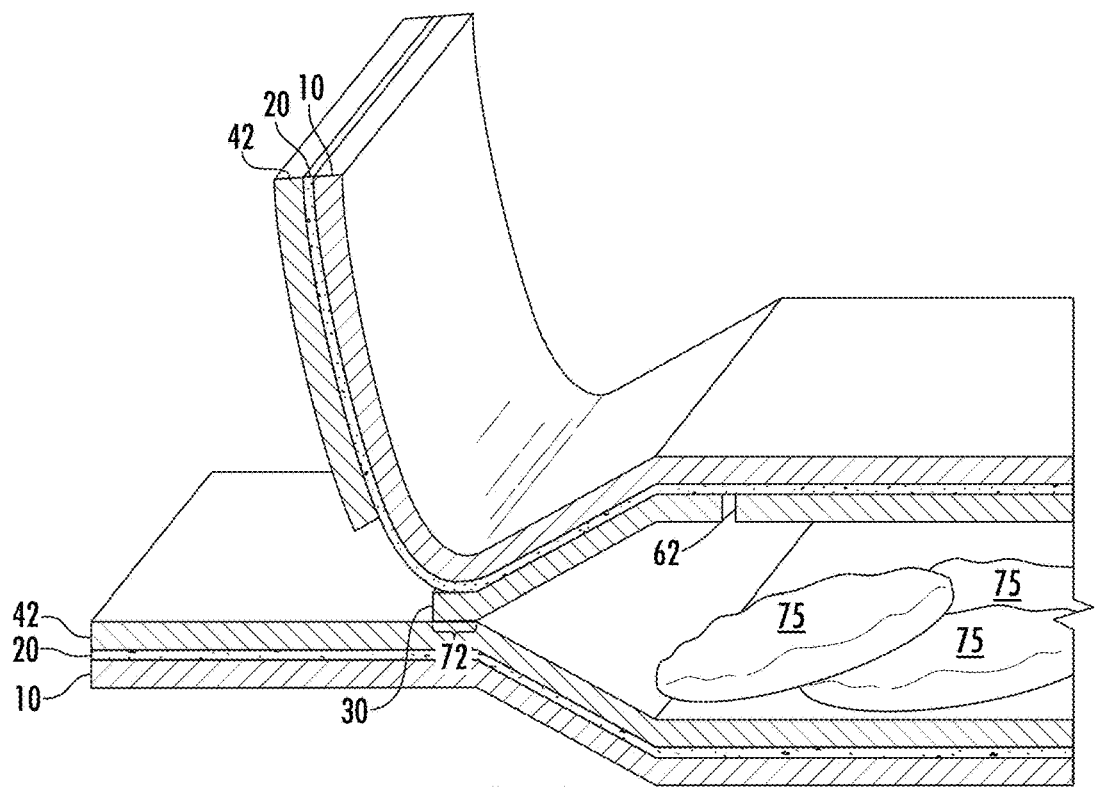
Figure 3D:
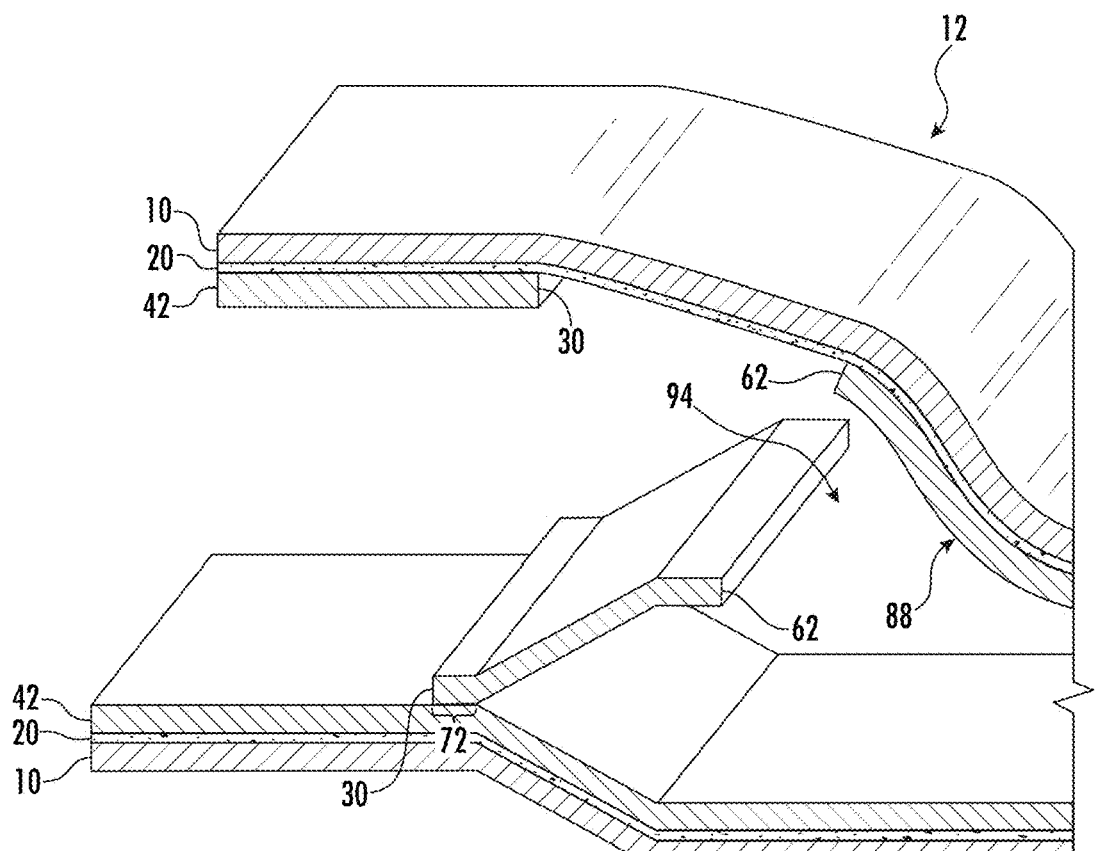
Figure 4:
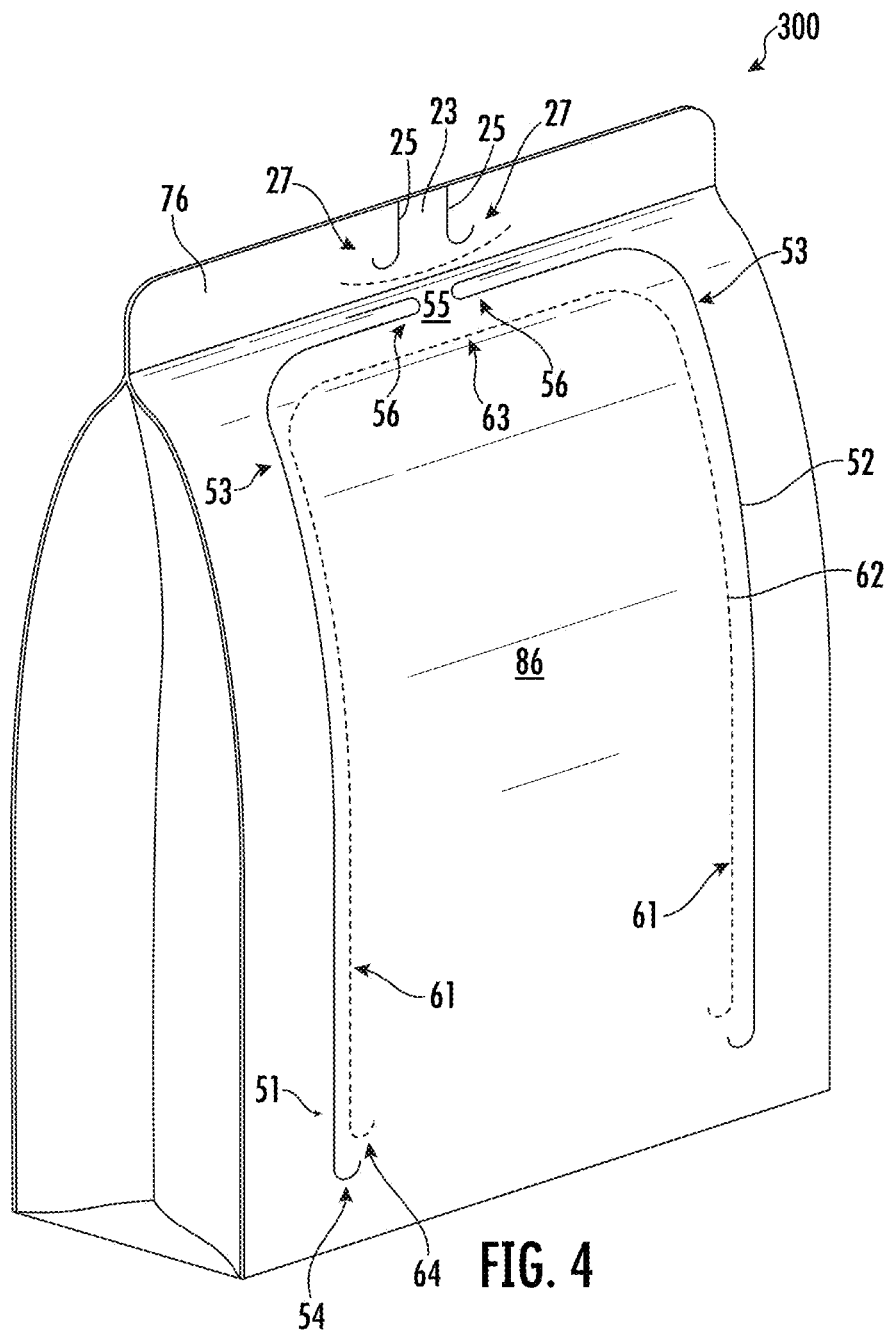
Figure 5:
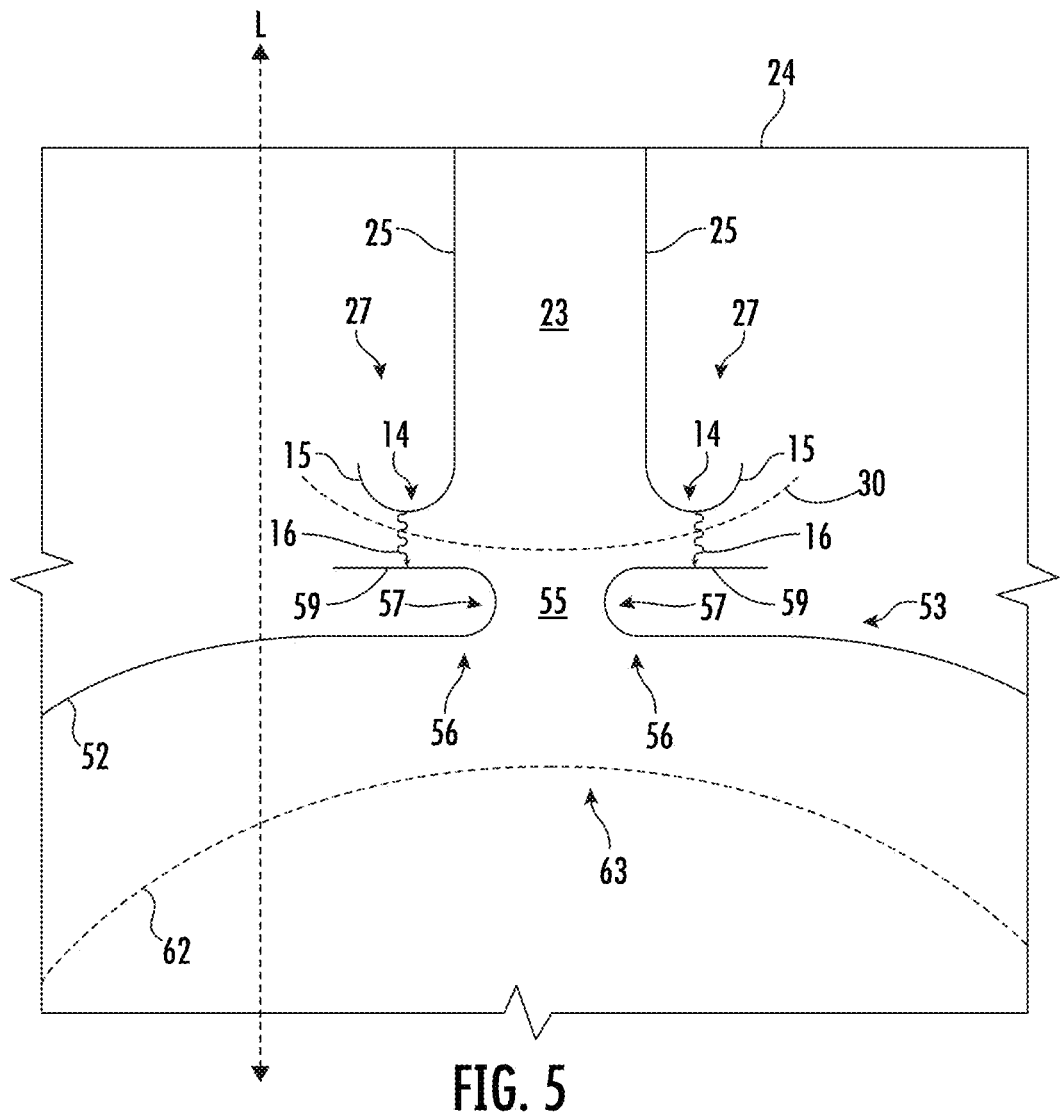
Figure 6:
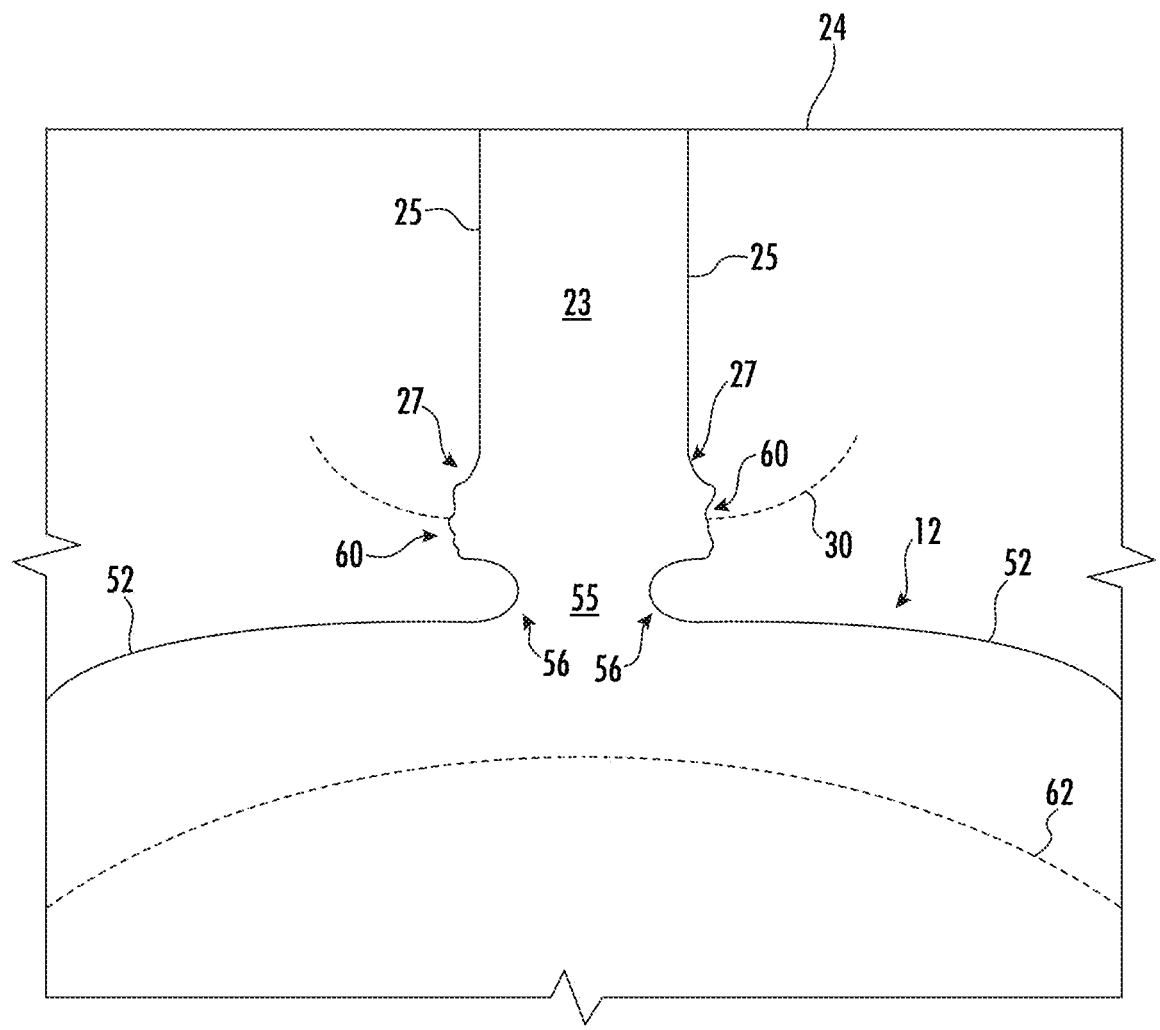
Figure 7A:
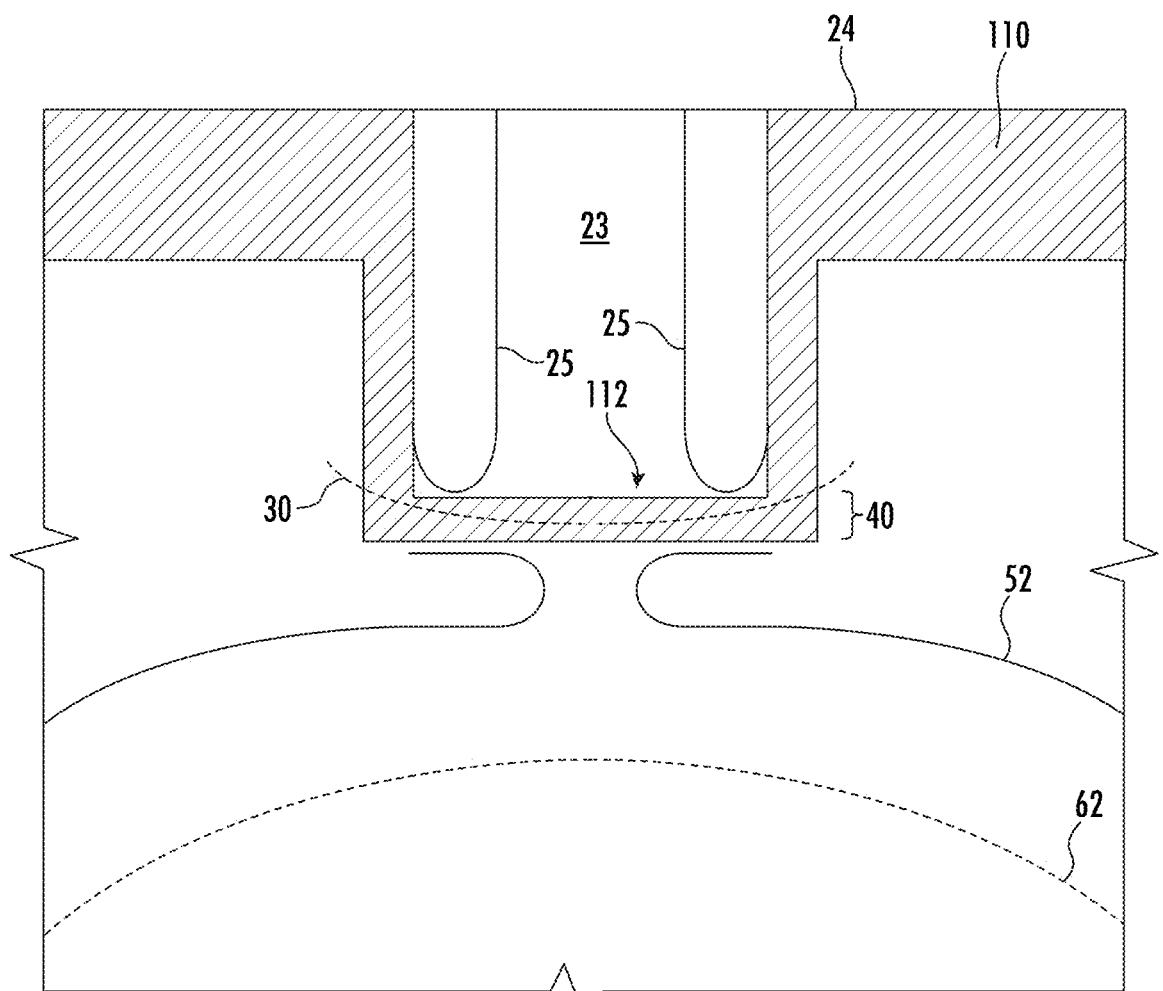
Figure 7B:
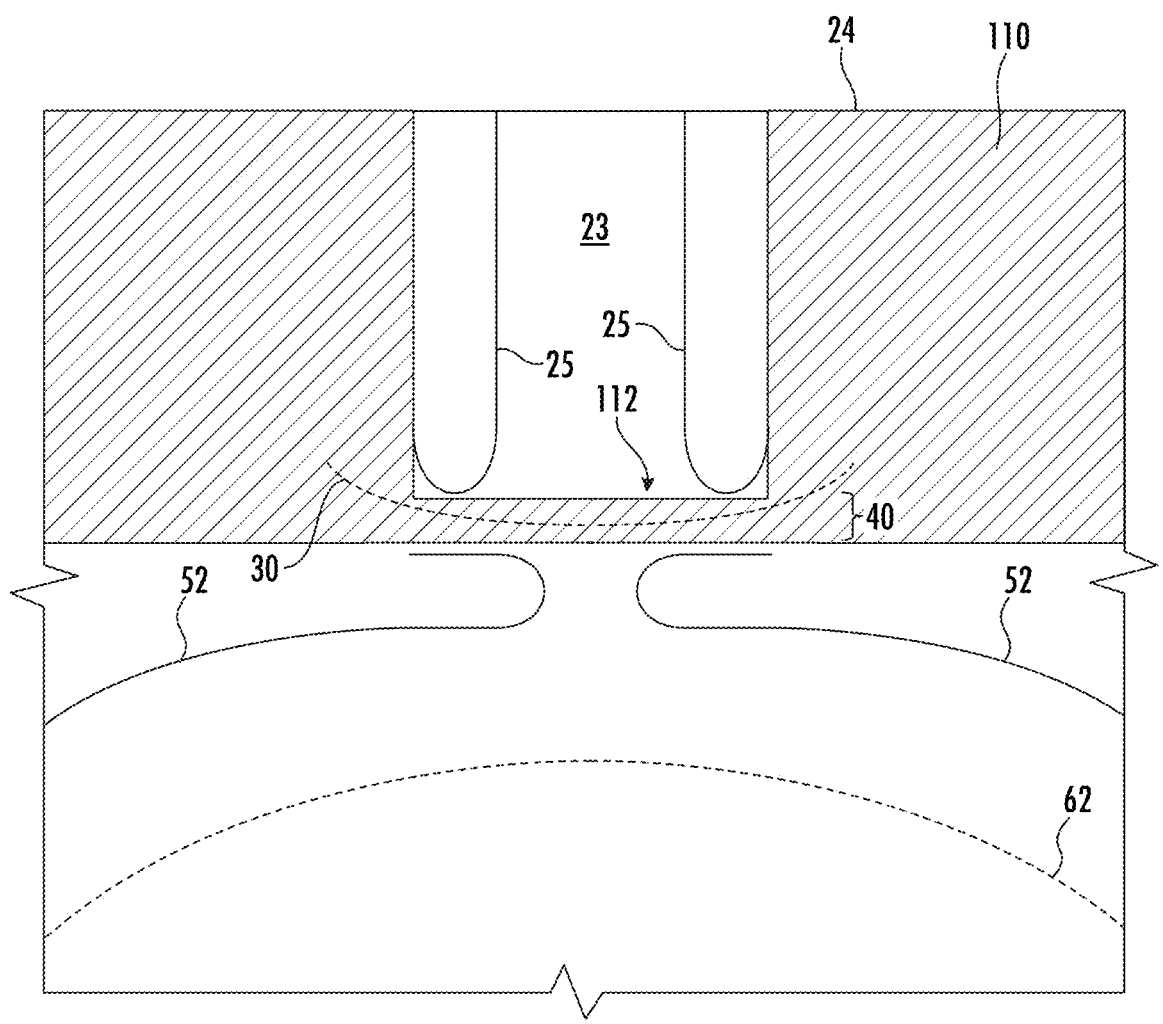
Figure 7C:
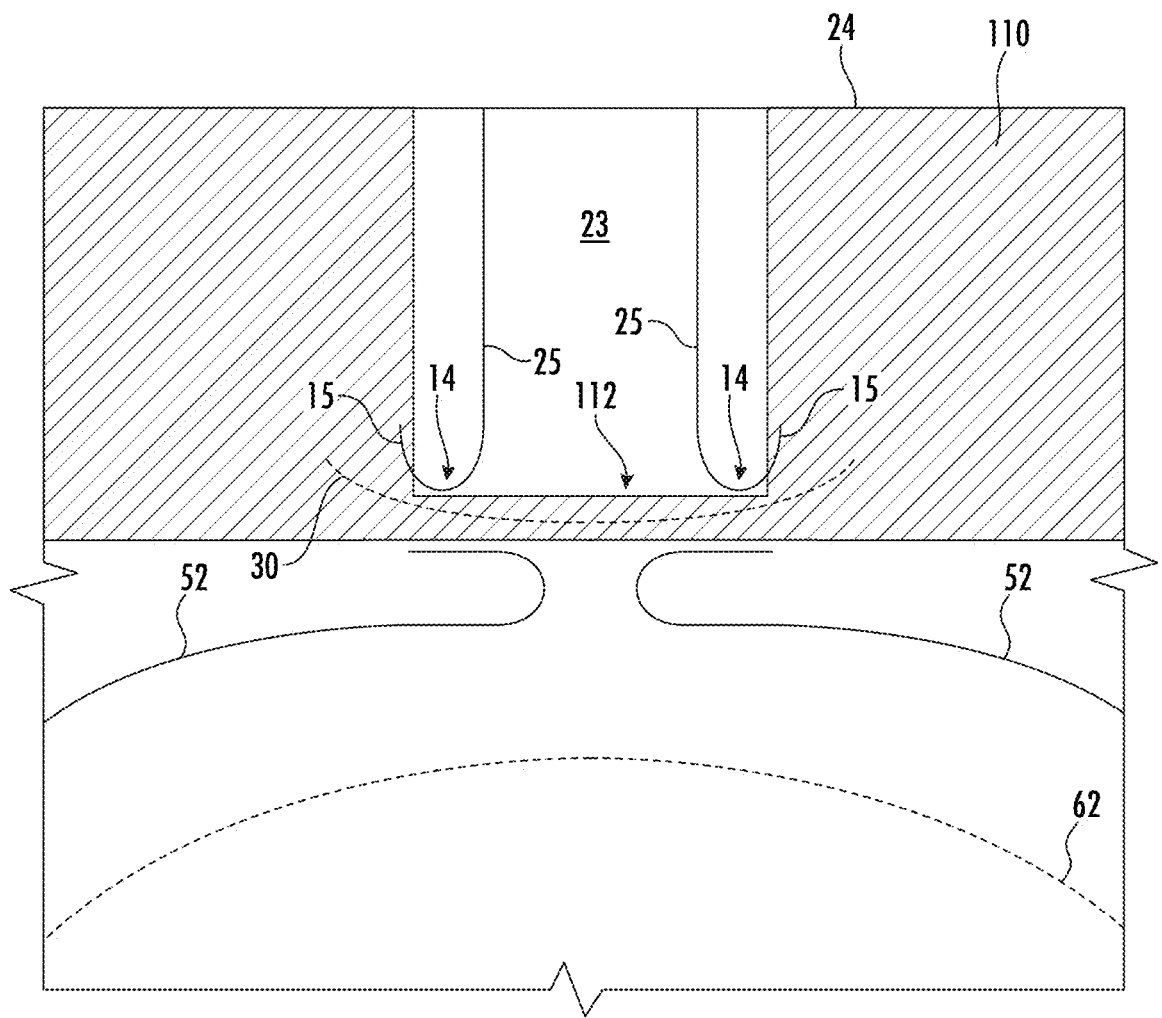
Figure 8A:
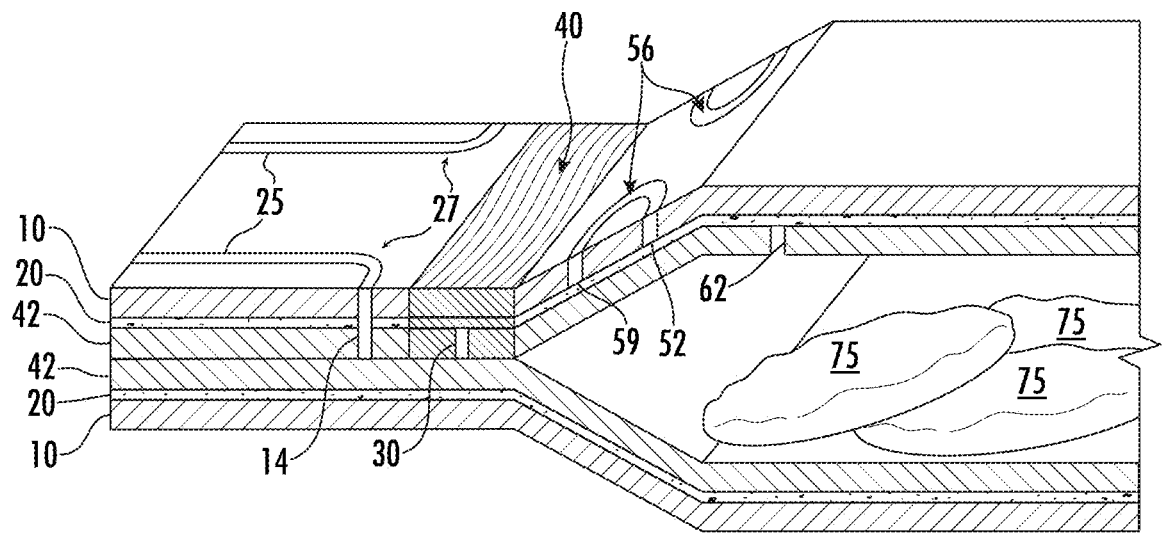
Figure 8B:
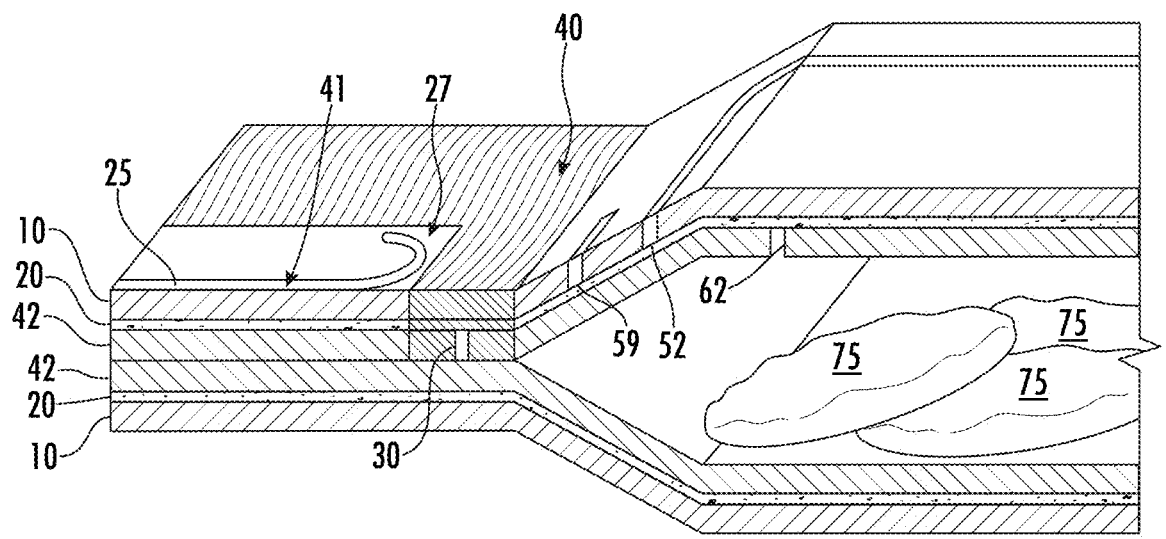
Figure 9A:
Figure 9B:
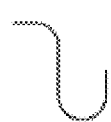
Figure 9C:
Figure 9D:
Figure 9E:
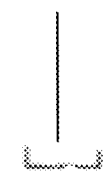
Figure 9F:
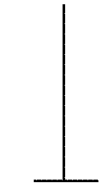
Figure 9G:
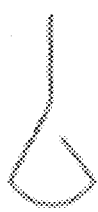
Figure 9H:
Figure 9I:
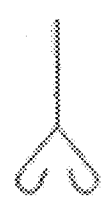
Figure 9J:
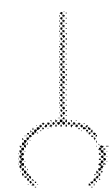
Figure 9K:
Figure 9L:

Having thus described the disclosure in general terms, reference will now be made to the accompanying drawings, which are not necessarily drawn to scale, and wherein:

FIG. 1A is a perspective view of a closed package in an embodiment of the invention;

FIG. 1B is a perspective view of the package shown in FIG. 1A, in an open configuration, in an embodiment of the invention;

FIG. 2 is a top view of a laminate roll in an embodiment of the invention;

FIGS. 3A-3D are perspective cross-sectional views of a package in an embodiment of the invention, through line A-A in FIG. 2; and FIG. 4 is a perspective view of stand-up pouch in an embodiment of the invention;

FIG. 5 is an exploded top view of a laminate in an embodiment of the invention;

FIG. 6 is an exploded top view of a laminate in an embodiment of the invention after the packaging structure has been opened;

FIGS. 7A-7C are exploded top views of a laminate and a heat seal tool in an embodiment of the invention;

FIG. 8A is a cross-sectional view of a package in an embodiment of the invention, through line B-B in FIG. 2;

FIG. 8B is a cross-sectional view of a package in an embodiment of the invention, through line C-C in FIG. 2

FIGS. 9A-9L illustrate various tear propagating elements and/or tear receiving elements that may be utilized in the invention; and FIGS. 10A-10E illustrate various tear directional elements that may be utilized in the invention.

DETAILED DESCRIPTION

The present inventions now will be described more fully hereinafter with reference to the accompanying drawings, in which some but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

In an embodiment of the invention, a flexible packaging laminate is constructed to have an integral opening and reclose function, a pull tab, and a tamper-evidence feature. The laminate is constructed as a multi-layer structure by adhesively laminating a first structure to a second structure, wherein each of the first and second structures may comprise one or more layers of flexible material. Pressure sensitive adhesive is applied to one of the structures before lamination. Once the laminate is formed in this manner, scoring operations are performed.

In an embodiment, one or more scoring operations are performed on each side of the laminate. In an embodiment, some scoring operations penetrate only through a part of the thickness of the laminate; in particular, a scoring operation performed on the side of the laminate adjacent the first structure results in penetration through the first structure, but without complete penetration through the second structure, and preferably without any substantial penetration, and more preferably without any penetration, into the second structure. Likewise, a scoring operation performed on the side of the laminate adjacent the second structure results in penetration through the second structure, but without complete penetration through the first structure, and preferably without any substantial penetration, and more preferably without any penetration, into the first structure. However, in some scoring operations set forth herein, the scoring comprises a complete penetration through both the first and second structure. The scoring operations may form the peelable/reclosable flap, the pull tab, and the tamper-evidence features, as further described below.

In some embodiments, the package is formed to have an integral opening and reclose feature by forming the laminate as a two-part structure, having an outer structure joined in face-to-face relation with an inner structure. Each of the outer and inner structures can comprise one or more layers of flexible packaging material such as polymer film, paper, metal foil, and the like. An outer line of weakness is formed in the outer structure to define an outer opening portion that can be lifted out of the plane of the outer structure. Similarly, an inner line of weakness is formed in the inner structure to define an inner opening portion that can be lifted out of the plane of the inner structure. The outer and inner opening portions are attached to each other such that the outer and inner opening portions can be lifted out of the plane as a unit, thereby creating an opening through the packaging structure defined by the inner line of weakness.

The outer opening portion is larger in area than the inner opening portion and has a marginal region that extends beyond the peripheral edge of the inner opening portion. When the outer and inner opening portions are lifted out of the plane to create the opening, an underlying portion of the inner structure in registration with the marginal region of the outer opening portion is exposed adjacent the opening. A pressure sensitive adhesive is applied to the inner surface of the outer structure and/or the outer surface of the inner structure. In an embodiment, the pressure sensitive adhesive is flood coated (100% coverage) over the inner surface of the outer structure and/or the outer surface of the inner structure. Therefore, after initial lifting of the outer and inner opening portions, the opening through the structure can be reclosed by adhering the marginal region of the outer opening portion to the underlying portion of the inner structure via the pressure sensitive adhesive.

In an embodiment, the outer structure is adhesively joined to the inner structure via a pressure sensitive adhesive so as to form a laminate. The adhesive can be applied using any suitable equipment and techniques known in the art. In an embodiment, the pressure sensitive adhesive need not be applied such that there is a region that is free of the adhesive or is deadened to such adhesive, such as in the region of the pull tab. An adhesive-free region or deadened region between the inner and outer structure is not necessary in the present invention because the pull tab, in an embodiment, comprises both the inner and outer structure. In contrast to existing packaging structures, the tab of the present invention is not comprised of just the outer structure. The outer structure and inner structure may be coextensive with each other and may each be continuous webs drawn from respective supply rolls and laminated together to form a laminate that is a continuous web.

In an embodiment, the laminate may be thereafter scored to form one or more outer lines of weakness (also referred to herein as "score lines") through the thickness of the outer structure, one or more inner score lines through the thickness of the inner structure, and one or more throughcut score lines which extend through the outer structure and the inner structure. Advantageously, because the structure is flood coated with pressure sensitive adhesive, the score lines need not be registered with respect to the adhesive or, in an embodiment, any printed material.

In an embodiment, the outer score line delineates the outer opening portion of the outer structure that is separable from the remainder of the outer structure along the outer score line, and the inner score line delineates the inner opening portion of the inner structure that is affixed to the outer opening portion by the adhesive and is separable from the remainder of the inner structure along the inner score line. The outer line of weakness or score line preferably penetrates through the thickness of the outer structure but not through the inner structure. Similarly, the inner score line preferably penetrates through the thickness of the inner structure but not through the outer structure.

In an embodiment, a separate inner score line defines a portion of the tamper evidence feature. In an embodiment, a throughcut score line penetrates through the thickness of the inner and outer structure and defines at least a portion of the pull tab. In an embodiment, the score lines are formed by laser scoring. However, other methods, such as mechanical scoring, die cutting, kiss cutting, or a combination thereof may be utilized.

The inner structure or outer structure may include a barrier layer providing a barrier against the passage of moisture and/or oxygen. In some applications such as the packaging of moisture-sensitive products (e.g., cookies or similar products that tend to be degraded when exposed to the environment), it is important to provide a moisture barrier. The barrier layer can comprise any of various polymer-based barrier materials including barrier polymer films such as ethylene vinyl alcohol copolymer (EVOH), polyamide, and the like; metallized polyolefin films such as polyethylene, polypropylene, oriented polypropylene, and the like; AlOx-coated polymer films; SiOx-coated polymer films; metal foil such as aluminum foil; and others. Although the term "barrier layer" is used in connection with metallized films to refer to the entire metallized film, it will be recognized that it is the layer of metal that provides the barrier function. Likewise, it is the AlOx or SiOx coating that provides the barrier function in the ceramic-coated films, but the entire film nevertheless is referred to herein as a "barrier layer".

The outer structure may comprise a layer of polyester such as polyethylene terephthalate, which has a desirable crisp feel and is readily printed. The polyester layer can be printed with inks to provide graphics and indicia. In certain embodiments, the polyester layer is transparent and is reverse printed on the surface that faces the inner structure. In an embodiment, the outer structure may comprise reverse-printed ink, primer, and acrylic layers.

In an embodiment, the inner structure may comprise polyethylene terephthalate, low density polyethylene terephthalate, oriented polypropylene, or any other material known in the art. In an embodiment, the inner structure is heat sealable. In an embodiment, the inner structure may be metalized or may include and aluminum oxide barrier.

Turning to particulars, in the method of manufacture, a first structure (optionally the outer structure) may be advanced from a supply roll. One or both surfaces of the first structure may be optionally treated by corona discharge or a flame treatment to render the surface(s) more receptive to inks and/or to render the surface(s) more readily bondable to the pressure sensitive adhesive that is subsequently applied to the surface as described below. The first structure may optionally be pre-printed or may be printed as a part of the presently described manufacturing process. The inks and printing may be applied to the exterior surface of the first structure or to the interior surface via a reverse printing process. The first structure may comprise one or more layers of flexible packaging material, including polymers such polyesters, polyolefins (including homopolymers and copolymers), polyamides, and others, paper, and/or metal foil. In an embodiment, the first structure may comprise at least a layer of polyester such as polyethylene terephthalate.

In an embodiment, a second structure may also be advanced from a supply roll. One or both surfaces of the second structure may be optionally treated by corona discharge or a flame treatment, as set forth above, or may be printed, reverse-printed, or the like. The second structure may be coextensive with the first structure (i.e., the width of the second structure may be substantially equal to the width W of the first structure and the longitudinal edges of the second structure may substantially coincide with the longitudinal edges of the first structure $L_1$, $L_2$). As used herein, the longitudinal edges of the first structure, second structure, and/or laminate refer to the edges set forth in FIG. 2 which extend in the machine direction of the film, perpendicular to the edge of the film wherein the roll is initiated. In an embodiment, the second structure comprises the inner film structure and the first structure comprises the outer film structure, with respect to the resulting laminate. The second structure may comprise one or more layers of flexible packaging material, including polymers such polyesters, polyolefins (including homopolymers and copolymers), polyamides, and others, paper, and/or metal foil.

In an embodiment, a pressure sensitive adhesive is applied to the first structure and/or the second structure. In an embodiment, the pressure sensitive adhesive is flood coated (100% coverage) onto the surface of the relevant structure. In an embodiment, the pressure sensitive adhesive may cover substantially the entirety of the first structure and/or second structure. The pressure sensitive adhesive can comprise various compositions. Pressure sensitive adhesives form viscoelastic bonds that are aggressively and permanently tacky, adhere without the need of more than a finger or hand pressure, and require no activation by water, solvent or heat. Pressure sensitive adhesives are often based on non-crosslinked rubber adhesives in a latex emulsion or solvent-borne form, or can comprise acrylic and methacrylate adhesives, styrene copolymers (SIS/SBS), and silicones. Acrylic adhesives are known for excellent environmental resistance and fast-setting time when compared with other resin systems. Acrylic pressure sensitive adhesives often use an acrylate system. Natural rubber, synthetic rubber or elastomer sealants and adhesives can be based on a variety of systems such as silicone, polyurethane, chloroprene, butyl, polybutadiene, isoprene, or neoprene. When the packaging laminate of the invention is to be used for food packaging, the pressure sensitive adhesive generally must be a food grade composition. Various pressure sensitive adhesives are approved by the U.S. Food and Drug Administration for use in direct food contact, as regulated by 21 CFR Part 175.300. A food-grade pressure sensitive adhesive for use in the present invention is Jonbond 743 available from Bostik Findley. The adhesive application can comprise any suitable device capable of applying the pressure sensitive adhesive to the structure and the pressure sensitive adhesive may comprise any pressure sensitive adhesive known in the art. After application of the pressure sensitive adhesive, the relevant structure may be advanced to a dryer such as an oven or the like, to dry or partially dry the pressure sensitive adhesive.

Optionally, a permanent laminating adhesive may be pattern applied to the first or second structure in one or more locations. The permanent adhesive can comprise various compositions. Suitable examples include two-component polyurethane adhesive systems, such as Tycel 7900/7283 available from Henkel.

The first and second structures may then be laminated together, such as via a pair of rolls forming a nip therebetween. The first and second structures may be passed through the nip and laminated to each other. In a typical process, the laminate would then be advance to a reel-up where it is wound into a roll for subsequent processing in a second, offline scoring phase of the manufacturing process. In the present invention, however, the scoring steps of the invention may be performed inline with the lamination steps. In the process of the invention, the manufacture of the laminate and the incorporation of the opening/reclose and tamper-evidence features in the laminate are conducted in an in-line fashion as part of the same overall process. The process of the invention thus is much more efficient and less costly.

Manufacturing equipment may be provided which can apply adhesive, laminate layers, and score the laminate within the same processing line. In an embodiment, the scoring equipment comprises a laser scoring device. The depth of the score line formed by a laser can be regulated by regulating the power output or beam intensity of the laser beam, the width or spot size of the laser beam, and the amount of time a given spot on the film surface is irradiated by the beam. These factors generally are selected based on the characteristics of the material being scored. Some materials are more readily scored by lasers than other materials, as known in the art. The depth of the score line formed by the laser can be regulated by regulating the power output or beam intensity of the laser beam, the width or spot size of the laser beam, and the amount of time a given spot on the film surface is irradiated by the beam. These factors generally are selected based on the characteristics of the material being scored. For example, a wavelength of 10.6 microns may be utilized to score a first structure and/or second structure which comprises polyethylene terephthalate.

In an embodiment, several score lines may be formed in the laminate as part of the scoring process. The several score lines may be formed simultaneously or may be formed sequentially, in any sequence known in the art. Thus, while the steps herein are referred to as first, second, etc., the process should not be so limited.

Referring to the figures, in an embodiment, a first score line 52 (i.e. outer or overcut score line) may be formed through the thickness of the first (outer) structure 10. Because the pressure sensitive adhesive 20 has been flood coated and not pattern-applied in this embodiment, the first score line 52 does not need to be formed in registration with (i.e., coincide with) any pattern of pressure sensitive adhesive 20. The first score line 52 extends substantially through the thickness of the first structure 10, but preferably does not extend to any substantial extent into the second (inner) structure 42. The score line 52 may or may not extend into the pressure sensitive adhesive layer 20.

Generally speaking, the first score line 52 may comprise a substantial portion of the perimeter of the outer opening portion 86 of the flap 12 (see FIGS. 1A-1B) into the package. The first score line 52, in an embodiment, is discontinuous. In an embodiment, the first score line 52 actually comprises two separate score lines. In an embodiment, the first score line(s) 52 extend at least partially longitudinally along the laminate, parallel to the longitudinal edges $L_1$, $L_2$ of the laminate (see FIG. 2). In an embodiment, the first score line(s) 52 extend at least partially in the machine direction M of the laminate (see FIG. 2). In an embodiment, the first score line(s) 52 extend inward of and at least partially along the longitudinal edges $L_1$, $L_2$ of the laminate. In another embodiment, the first score line(s) 52 coincide with the longitudinal edges $L_1$, $L_2$ of the laminate (and thus, no scoring is necessary along such longitudinal edges $L_1$, $L_2$).

In an embodiment, the first score lines 52 may have a base end 51 opposite the pull tab 23 (described below) and a leading end 53 nearest the pull tab 23. In an embodiment, the first score line(s) 52 may connect at their base end. In this embodiment, the outer opening portion 86 of the flap 12 may comprise a removable flap portion. In other embodiments, however, the score line(s) 52 may not connect at their base end 51. Rather, the score line(s) 52 may terminate in j-hooks 54 on their base end 51, preventing the flap 12 from being pulled beyond the position of the j-hooks 54. In an embodiment, the "hook" of the j-hooks 54 on the base end 51 of the score lines 52 is directed longitudinally, in the machine direction M of the laminate film web, or parallel to the longitudinal edges $L_1$, $L_2$ of the laminate.

In an embodiment, the leading end 53 of each score line 52 may be directed inwardly, whether angularly or in a curved manner, to form an outer opening portion 86 of the flap. In a particular embodiment, the score lines 52 curve gradually inwardly in a partial ovular or elliptical manner.

In an embodiment, the score lines 52 do not connect on their leading end 53. Rather, there is uncut film material 55 between the two ends of the score lines 52, on their leading ends 53. In an embodiment, the width of the uncut film material 55 between the two ends of the score lines 52 is approximately the width of the tab 23. In an embodiment, the width of the uncut film material 55 between the two ends of the score lines 52 is less than the width of the tab 23. In an embodiment, the width of the uncut film material 55 between the two ends of the score lines 52 is about half the width of the tab 23. In an embodiment, the width of the uncut film material 55 between the two ends of the score lines 52 is greater than the width of the tab 23.

In an embodiment, the two ends of the score lines 52, on their leading end 53, terminate in j-hooks 56. In an embodiment the j-hooks 56 on the leading end 53 of the score lines 52 are perpendicular to the j-hooks 54 on the base end 51 of the score lines 52. In an embodiment, the arm 59 of the j-hooks 56 on the leading end 53 of the score lines 52 is directed laterally, toward or perpendicular to one of the longitudinal edges $L_1$, $L_2$ of the laminate. In an embodiment, the j-hooks 56 on the leading end 53 of the score lines 52 comprise at least a portion of the tamper evidence features of the invention.

A second score line 62 (i.e. inner or undercut score line) may formed through the thickness of the second (inner) structure 42. Again, because the pressure sensitive adhesive 20 has not been pattern-applied, the second score line 62 need not be in registration with the pressure sensitive adhesive 20. The second score line 62 extends substantially through the thickness of the second (inner) structure 42, but preferably does not extend to any substantial extent into the first (outer) structure 10. The second score line 62 may or may not extend into the pressure sensitive adhesive layer 20. The second score line 62 is spaced inwardly of the first score line 52 so as to define an inner opening portion 88 of smaller area than the outer opening portion 86. As further described below, the inner opening portion 88 is adhered to the outer opening portion 86 such that both portions 86, 88 are lifted together when opening the package.

In an embodiment, the second score line 62, may be continuous (i.e. a closed shape such as an oval, square, rectangle, ellipse, circle, or other shape. In this embodiment, the inner opening portion 88 may fully separate from the remainder of the inner structure 42. In this embodiment, the second score line 62 may connect at its base end 61 (described below).

In an embodiment, the second score line 62 generally mirrors the configuration of the first score lines 52. In an embodiment, the second score line 62 extends at least partially parallel to longitudinal edge L1, L2 along the laminate. In an embodiment, the second score line 62 extends at least partially in the machine direction M of the laminate.

In an embodiment, the second score line 62 may have a base end 61 opposite the pull tab 23 and a leading end 63 nearest the pull tab. In an embodiment, the second score line 62 extends at least partially in a direction which is perpendicular to the longitudinal edges L1, L2 of the laminate on its leading end 63. Contrary to the first score line 52, the second score line 62 may be continuous on its leading end 63. In an embodiment, the leading end 63 of the score line 62 may be configured angularly or in a curved manner. In a particular embodiment, the leading end 63 of the score line 62 may be ovular or elliptical. In an embodiment, the second score line 62 may be generally U-shaped or C-shaped, with the open end of the "U" or "C" directed toward the base end 61.

In an embodiment, the second score line 62 may be discontinuous and may not connect at its base end 61. Rather, second score line 62 may terminate in j-hooks 64 on its base end 61, preventing the flap 12 from being pulled beyond the position of the j-hooks 64. In this embodiment, the inner opening portion 88 of the flap defined by the score line 62 may have a generally U-shaped perimeter having three sides defined by the score line 62, and may be attached to the remainder of the inner film 42 along a fourth side (i.e., an imaginary line extending between the free ends of the two legs of the U-shaped score line 62). As noted, the second score line 62 may be generally parallel to the first score line 52, but may be spaced inwardly of the first score line 52 so as to define an inner opening portion 88 of smaller area than the outer opening portion 86. In an embodiment, the j-hooks 64 on the base end 61 of the second score line 62 may be closer to the tab 23 than the j-hooks 54 on the base end 51 of the second score line 52. In an embodiment, the j-hooks 64 and/or the j-hooks 54 may be directed inwardly (toward the center of the flap 12) or outwardly.

In an embodiment, there is a marginal region 90 of the outer opening portion 86 that extends beyond the edge of the inner opening portion 88. The pressure sensitive adhesive 20 is disposed between this marginal region 90 and an underlying surface 92 of the inner structure 42. The outer opening portion 86 and inner opening portion 88 are also joined by the pressure sensitive adhesive 20.

In an embodiment, the scoring process set forth herein additionally forms a pull tab 23. Typically, a pull tab in a packaging structure such as the one described herein is constructed such that the tab is formed in only the outer layer of a laminate structure. The pull tab would often be free from adhesive or lamination to the inner layer or deadened with respect to any adhesive positioned therein. In the present invention, however, the pull tab 23 comprises both the first (outer) and second (inner) film layers and the pressure sensitive adhesive layer 20 therebetween. In the present invention, the pull tab 23 may be disposed in a central zone of the laminate, between the longitudinal edges L1, L2 of the laminate. In another embodiment, the pull tab 23 may be centered between the portions of the first cut lines 52 which are parallel to the longitudinal edges L1, L2 of the laminate. However, the pull tab 23 may be disposed in any position and should not be so limited.

The pull tab 23 may be defined by two score lines 25 which are disposed through both the first (outer) 10 and second (inner) 42 structures of the laminate as well as through the pressure sensitive adhesive layer 20 of the laminate. Thus, the pull tab 23 score lines 25 are through score lines in this embodiment. The pull tab 23 score lines 25 may be parallel or substantially parallel to one another. The pull tab 23 score lines 25 may be parallel or substantially parallel to the longitudinal edges L1, L2 of the laminate. In other embodiments, the score lines 25 may be curved, angled, or irregular. The score lines 25 may be designed in a shape and configuration to draw attention to the tab 23 in particular embodiments.

In an embodiment, the distance between score lines 25 may be between about ½ inch and about 1 inch. In another embodiment, the distance between score lines 25 may be between about ⅝ inch. In another embodiment, the distance between score lines 25 may be less than the distance between the apexes 57 of the j-hooks 56 of the first score line 52 (FIG. 5, discussed below).

In an embodiment, the score lines 25 initiate at the edge of the packaging structure 24. In this embodiment, when the laminate web shown in FIG. 2 is cut into individual packaging structures, the cut line 24 will comprise the edge of the packaging structure (perpendicular to the longitudinal edges L1, L2 of the laminate). In other embodiments, the score lines 25 may extend beyond the cut line 24. In any case, when the laminate is slit into packaging structures, the cut line 24 will comprise the edge of the tab 23. Alternatively, a separate cut line could be formed which comprises the edge of the tab.

In an embodiment, the score lines 25 terminate in j-hooks 27 opposite the edge of the packaging structure 24. That is, on the interior end of the tab 23 (with respect the packaging structure), the tab 23 may terminate in j-hooks 27. Thus, the score lines 25 which define tab 23 are discontinuous with any other score lines. The tab 23 j-hooks 27 may be disposed as through cuts, through each of the first structure 10, pressure sensitive adhesive layer 20, and second structure 42, may be disposed through only the first (outer) structure 10 (i.e. an outer or overcut score line), or may be disposed through only the second (inner) structure 42 (i.e. an inner or undercut score line). The tab 23 j-hooks 27 may be disposed such that the arms 15 of the j-hooks 27 are directed perpendicularly or substantially perpendicularly to the longitudinal edges L1, L2 of the laminate. The arms 15 of the j-hooks 27 may be parallel or substantially parallel to the cut lines 25. The arms 15 of the j-hooks 27 may be parallel or substantially parallel to the longitudinal edges L1, L2 of the laminate, in an embodiment. In an embodiment, there is uncut film material of at least the first layer 10 between the j-hooks 56 and j-hooks 27. In another embodiment, there is uncut film material which comprises the first structure 10, the pressure sensitive adhesive layer 20, and the second structure 42 between the j-hooks 56 and j-hooks 27.

It should be noted that while the disclosure herein refers to certain elements (i.e. 27, 54 and 56) as j-hooks, any form of tear propagation restriction, management or direction may be used, such as Sheppard hoods, smile hooks, T-hooks, double j-hooks, dovetail, or score lines which have no common nomenclature in the art (see FIGS. 9A-9L). Likewise, the tear propagation restriction, management or directional elements may be inwardly oriented, outwardly oriented, angularly oriented, horizontally oriented, vertically oriented, or may be disposed in any other orientation known in the art.

More particularly, elements 27 may be referred to herein as tear propagation elements, as they are intended, among other things, to propagate tear line 16 from the tab score line 25 toward line 30 and tear receiving elements 56. Likewise, tear receiving elements 56 are intended to receive the tear line 16. Tear propagation elements 27 and tear receiving elements 56 may take any form disclosed herein (see, for example, FIGS. 9A-9L) or known in the art and may be the same as each other or may be different from one another.

In an embodiment, an additional score line 30 is disposed through the second (inner) structure 42 without being disposed through (or without being disposed substantially or fully through) or within the first (outer) structure 10. The additional score line 30 may be undercut, in an embodiment. The additional score line 30 is disposed between the j-hooks 27 of the tab 23 and the j-hooks 56 of the first cut line 52. In an embodiment, the score line 30 comprises a curved line, concave toward the tab 23. The score line 30 may comprise a "smile" with its upward curved ends closer to the tab 23. In an embodiment, the score line 30 is generally perpendicular to the longitudinal edges L1, L2 of the laminate through its central portion but gradually curves toward the tab 23 near its opposite ends. In an embodiment, the score line 30 has a consistent radius of curvature throughout its length.

In other embodiments, the score line 30 may be angled (i.e. a chevron or arrow) or have various radii of curvature throughout its length. In an embodiment, the score line 30 may take any form which directs or propagates a tear from the j-hooks 27 of the tab 23 toward the j-hooks 56 of the first cut line 52 when the tab 23 is pulled away from the packaging structure (see examples in FIGS. 10A-10E). In an embodiment, each opposite end of the score line 30 extends toward its respective longitudinal edge L1, L2 of the laminate.

In an embodiment, each end of the score line 30 extends beyond the edges of the j-hooks 27 of the tab 23 and/or beyond the edges of the j-hooks 56 of the first cut line 52. In an embodiment, the score line 30 extends beyond the apexes 14 of the j-hooks 27 of the tab 23. In an embodiment, the score line 30 extends beyond the arms 15 of the j-hooks 27 of the tab 23. In an embodiment, the score line 30 extends beyond the portion of the arms 15 of the j-hooks 27 of the tab 23 that is closest to the respective longitudinal edge L1, L2 of the laminate.

In an embodiment, the score line 30 extends beyond the apexes 57 of the j-hooks 56 of the first cut line 52. In an embodiment, the score line 30 extends beyond the arms 59 of the j-hooks 56 of the first cut line 52. In an embodiment, the score line 30 extends beyond the portion of the arms 59 of the j-hooks 56 of the first cut line 52 that is closest to the respective longitudinal edge L1, L2 of the laminate.

In an embodiment, the length of score line 30 (extending toward the opposite longitudinal edges L1, L2 of the laminate) may be between about 1 inch and about 3 inches. In a particular embodiment, the length of score line 30 may be between about 1¾ inch and about 2 inches. In another embodiment, the length of score line 30 may be about 1¾ inch or about 2 inches.

In an embodiment, the distance between the j-hooks 27 of the tab 23 and the score line 30 is between about ⅛ and 3/16 inches. In an embodiment, the distance between the j-hooks 56 of the first cut line 52 and the score line 30 is also between about ⅛ and 3/16 inches. In an embodiment, the distance between (a) the j-hooks 27 of the tab 23 and the score line 30 and/or (b) the j-hooks 56 of the first cut line 52 and the score line 30 is less than the distance between the apexes 14 of the j-hooks 27 or the apexes 57 of the j-hooks 56. In certain top view or perspective figures, cut lines in only the first structure 10 or in both the first 10 and second structure 42 are shown in solid lines and cut lines in the second structure 42 are shown in dashed lines.

In an embodiment, the laminate score lines are designed to provide tamper evidence but also direct propagation of the tear to connect the tab 23 with the flap 12. In this embodiment, the j-hooks 27 of the tab 23 have an apex 14 (see FIG. 5). The tab 23 is designed such that as it is pulled toward the flap 12, tension is exerted on the apex 14 of the j-hooks 27 and a tear 16, preferably two tears 16, are propagated in the uncut portion of the laminate between the j-hooks 27 and the additional inner score line 30. The tear lines 16 are, in an embodiment, directed from the apexes 14 of the j-hooks 27 toward the additional inner score line 30 due to the shape and configuration of the j-hooks 27. If the tear lines 16 strays outwardly toward the respective longitudinal edges L1, L2 of the laminate, the tear line 16 intersects the additional inner score line 30 (which extends further toward the longitudinal edges L1, L2 of the laminate than the j-hooks 27) and is redirected toward the center of the additional inner score line 30. Thus, the additional inner score line 30 aids in directing the tear lines 16 in the correct direction. Because the additional inner score line 30 is scored in only the inner structure 42, it does not affect the hermeticity of the packaging. Once the additional inner score line 30 has been intersected, the tear lines 16 continue toward the j-hooks 56 of the first score line(s) 52.

The tear lines 16 then intersect the j-hooks 56 of the first score line 52. Because the first score line 52 and the j-hooks 56 are only disposed in the outer structure 10, again, the hermeticity of the packaging structure is maintained. Each of the j-hooks 56 of the first score line 52 has an apex 57 and an arm 59 which comprise the "hook" portion of the j-hook (see FIG. 5). The tear lines 16 preferably intersect the j-hooks 56 along the arms 59. The arms 59, in an embodiment, are directed toward the longitudinal edges L1, L2 and are perpendicular thereto. The arms 59 may extend toward the respective longitudinal edge L1, L2 further than the j-hooks 27 of the tab 23 (i.e. further than the apex 14 and/or further than the arm 15). In an embodiment, the distance between the apexes 57 comprises the uncut material 55. In an embodiment, the distance between the apexes 57 of the j-hooks 56 is less than the distance between the score lines 25 which form the tab 23. In an embodiment, the distance between the apexes 57 of the j-hooks 56 is such that even if the tear lines 16 propagate toward the space between the apexes 57, the tear line 16 will connect to the apexes 57. Once the tear lines 16 connect to the j-hooks 56, the tab 23 is connected to the first score line 52 and can be pulled to open the flap 12 of the packaging structure.

In an embodiment, the distance between the apex 57 and the end of the arm 59 of the j-hooks 56 of the first score line 52 is between about ⅛ and ½ inch. In another embodiment, the distance between the apex 57 and the end of the arm 59 of the j-hooks 56 of the first score line 52 is about ¼ inch. In an embodiment, the j-hooks 56 of the first score line 52 and the j-hooks 27 of the tab 23 are aligned such that the apexes 14 of the j-hooks 27 are directed to or are aligned with, in an longitudinal direction L, at least a portion of the arms 59 of the j-hooks 56. In an embodiment, the j-hooks 56 of the first score line 52 and the j-hooks 27 of the tab 23 are aligned such that the apexes 14 of the j-hooks 27 are directed to or are aligned with, in an longitudinal direction L, the apexes 57 of the j-hooks 56.

FIG. 6 illustrates a top view example of a tab 23 and flap 12 after being torn through and replaced back onto the packaging structure. As can be seen, the space between the j-hooks 27 of the tab 23 and the j-hooks 56 of the first score line 52 has been torn, resulting in neck portion 60 which comprises the connected j-hook 27 and j-hook 56. The neck portion 60 may have straight sides or may be irregularly shaped or may have irregular edges/sides due to the tearing of the film. The neck portion 60 comprises only the outer layer 10 in an embodiment. In an embodiment, the edges/sides of the neck portion 60 may extend toward the respective longitudinal edge L1, L2 further than the uncut portion 55. In this way, the uncut portion 55 may actually be narrower than the neck portion 60. Likewise, in an embodiment, the edges/sides of the neck portion 60 may extend toward the respective longitudinal edge L1, L2 further than the tab 23. In this way, the tab 23 may actually be narrower than the neck portion 60.

In an embodiment, the laminate described herein may be formed into a package using one or more methods known in the art. In an embodiment, the packages described herein may be formed and then heat sealed together at one or more ends of the package. In a particular embodiment, the laminate structure is rolled or folded and sealed to itself to form a package (i.e. a flow wrap package or a pouch). In this embodiment, package may have a top layer 100 and a bottom layer 102 (see FIGS. 3A-3D) or a front layer and a back layer. In another embodiment, the laminate structure is combined with and heat sealed to a separate web or container to form a package. At least one of the laminate structures may comprise components having thermoplastic properties to facilitate and improve the sealing properties of the heat seal. The heat seal may be obtained by bringing the laminate structure(s) or containers into contact with heat such that the thermoplastic components in the material melt and provides the heat seal. The heat seal may alternatively be obtained using any suitable method known in the art, for example, by hot air welding or conventional heat mold sealing.

In an embodiment, a specific heat seal tool is utilized to form a heat seal along the end of the packaging structure which comprises the tab 23. In this embodiment, it is desirable that that tab 23 portion of the laminate, which is formed in a top layer 100 of the package, not adhered to the bottom layer 102 of the package (see FIGS. 3A-3D). In this embodiment, a customized heat seal tool 110 (see FIG. 7A-7C) or heat seal jaw may be utilized such that it provides a heat seal along the edge of the laminate 24 other than in the area of the tab 23. In this embodiment, the heat seal tool 110 may be generally rectangular to seal along the edge 24 of the laminate but may recess inwardly in a hollow rectangle, square, semi-oval, semi-circle or the like. The recess 112 of the tool 110 may be configured to surround the score lines 25 to ensure that the score lines 25 that form the tab 23 are not heat sealed. In this embodiment, the entirety of the tab 23 may not be heat sealed. In an embodiment, the heat seal tool 110 may be configured such that it seals at least a portion of the arms 15 of the j-hooks 27 of the tab 23 (i.e. the recess 112 does not entirely surround the arms 15) (see FIG. 7C). In this embodiment, the recess 112 may surround the apex 14, however.

The tool 110 may be configured such that the heat seal encompasses/covers the inner score line 30 (i.e. the recess 112 does not extend over the score line 30). This may help ensure the hermeticity of the packaging structure upon opening. The heat seal is shown in cross section in FIG. 8, in an embodiment. The heat seal zone 40 encompasses the inner score line 30 but not encompass the cut line 25. In an embodiment, the at least a portion of the cut line 25 is disposed in a heat seal-free zone 41.

Alternatively, it would be encompassed within the invention to use a standard heat seal tool and deaden the area between the top layer 100 of the package and the bottom layer 102 of the package, in the area of the tab 23, such that the tab 23 is not sealed to the remainder of the packaging structure.

In use, a consumer may grasp the tab 23 and pull away from the packaging structure. Because the tab 23 is formed in the top film layer 100 and unaffixed to the bottom film layer 102, at least the edge of the tab 23 is easily separated, grasped, and pulled.

Upon grasping and pulling the tab 23, the user must pull the tab 23 through a heat-sealed zone 40 wherein the cut line 30 is disposed in the inner layer 42 (see FIGS. 8A-8B). Because the film is uncut between the j-hook 27 of the tab 23 and the inner cut line 30, at least one tear line 16 is propagated from the j-hook 27 of the tab 23 toward the inner cut line 30, at least in the outer film layer 52. In an embodiment, the tear lines 16 are propagated from the j-hook 27 of the tab 23 toward the inner cut line 30, through the outer film layer 52 and the inner film layer 10. As the tear lines 16 continue (or begin to stray), undercut line 30 directs the tear lines 16 toward the center of the laminate structure. Because the film is uncut between the inner cut line 30 and the j-hooks 56 of the outer flap cut line 52, the tear lines 16 then continue toward the j-hooks 56, at least in the outer film layer 52, forming the neck portion 60. Once the tab 23 is peeled back and the tear lines 16 reach inner cut line 30, the first structure 10 and the second structure 42 of the top film layer 100 begin to separate at the pressure sensitive adhesive 20 layer (FIG. 3C). In this embodiment, the top film layer 100 and bottom film layer 102 maintain their heat seal beyond the cut line 30 (the affixed zone 72).

As the tab 23 is continued to be peeled back, the first structure 10 tears through the uncut portion between the j-hooks 27 of the tab 23 and the j-hooks 56 of the first cut line 52. Once the tear reaches the j-hooks 56 of the first cut line 52, the opening portion 86 of the flap 12 begins to open.

When the outer opening portion 86 is detached from the remainder of the first structure 10, along the first score line 52, and is peeled back as in FIG. 3D, the inner opening portion 88 remains affixed to the outer opening portion 86, thereby creating an opening 94 in the top film layer 100 as defined by the second score line 62. The outer and inner opening portions form a flap 12 that remains attached, in an embodiment, along a hinge line defined between the free ends of the two legs of the score lines 52, 62.

The package is reclosable by re-attaching the pressure sensitive adhesive 20 to the surface 92 of the inner structure 42 to restore the package to a closed condition. It will, however, be readily apparent that the package has already been opened, because the outer film 10 will be torn through between the tab 23 and the flap 12. No amount of care in replacing the flap 12 in its original position can cover the fact that the area between the tab 23 j-hooks 27 and the first cut line 52 j-hooks 56 has been torn through. Accordingly, the invention provides a reliable tamper-evidence feature that is not easily circumvented.

FIGS. 1A and 1B show a flexible package 200. The package includes an outer wrapper 74 that envelopes the package contents and is sealed to enclose the contents. The outer wrapper 74 comprises a packaging laminate made by a method in accordance with the invention, such as the laminate previously described. The outer wrapper 74 may have a width greater than that shown in FIG. 2. The outer wrapper 74 may be manipulated into a tubular shape and the longitudinal edges L1, L2 of the wrapper 74 may be sealed together by a suitable sealant material to form a longitudinal seal (i.e. a fin seal, not shown), typically adjacent the bottom surface of the package. The opposing portions of the wrapper 74 are sealed together along transverse seal regions 76, 78 adjacent the opposite ends of the tubular wrapper. The ends of the wrapper 74 can be gusseted if desired, as known in the art.

In the illustrated package, the portion of the outer wrapper 74 having the score lines 52, 62 is on the top surface of the package. The area of the wrapper 74 bounded by the score lines can constitute any fraction of the total top surface of the package, but advantageously the area is a majority of the total surface area of the top surface.

Based on the previous description of the laminate and its formation process, it will be appreciated that the presence of the score lines 52, 62, 30 has little or no impact on the barrier function of the outer wrapper 74 because each score line extends only partially through the total thickness of the wrapper 74 and the score lines are not aligned with each other. Additionally, the pressure sensitive adhesive 20 fills the space between the score lines so that even if the score lines overlap somewhat in the thickness direction, there is still no open route between them. Furthermore, the score lines typically have a small width, on the order of a few thousandths of an inch. Additionally, while score lines 25 (which form the tab 23) extend completely through the thickness of the top layer of the wrapper 74, this has little or no impact on the barrier function of the outer wrapper 74 because the tab 23 is surrounded by a heat seal.

In some embodiments, the outer structure 10 can be substantially non-transparent or opaque without compromising the functionality of the tamper-evidence feature. The non-transparent or opaque character of the outer structure 10 can be a characteristic of the film material itself or can be achieved by a coating of ink or the like on the film.

In an embodiment, the outer structure 10 may have a greater affinity for bonding with the pressure sensitive adhesive 20 than does the surface 92 of the inner structure 42, and hence the pressure sensitive adhesive 20 is detached from the surface 92 and remains attached to the marginal region 90 of the outer opening portion 86 as shown in FIGS. 3A-3D. The greater bonding affinity of the outer structure 10 can be achieved in various ways. For example, the surface of the outer structure 10 can be treated by corona discharge or flame treatment, to increase the surface energy and enhance the bonding affinity. It is also possible to control the bond strength of the pressure sensitive adhesive to the layer by including an additive in the adhesive to reduce the bond strength, if desired.

Although it is preferred to have the pressure sensitive adhesive be applied to the outer structure and to remain on the outer structure upon opening, it is also within the scope of the invention to apply the pressure sensitive adhesive to the inner structure and to remain on the inner structure upon opening.

It will be appreciated from the above description that laminates made in accordance with the invention provide a tamper-evidence function for a package because after opening it is impossible to replace the flap 12 in such a way as to completely restore the package to its original unopened condition, as previously noted. When printing is included on the laminate, it is even more noticeable when the package has been opened because it is difficult to achieve perfect registration of the printed matter across the score line when reclosing the package.

The printing on the laminate can include text adjacent to the interrupted areas between the tab 23 j-hooks 27 and the first cut line 52 j-hooks 56, calling the consumer's attention to the presence of the interrupted areas and indicating that if they are torn through, the consumer should not purchase the package.

It should be noted that the terms "line of weakness" and "score line" as used herein refer either to a complete cutting through the thickness of one or more layers of the laminate or to a partial cutting through of the thickness of such layer(s) allowing the layer(s) to be severed along the score line. The terms may include perforated cut lines or continuous cut lines.

FIG. 2 illustrates a top view embodiment of a roll of flexible laminate 400 which may be utilized in the present invention. In roll 400, one flexible laminate structure is shown, but it should be understood that a plurality of flexible laminate structures may be present on roll 400. In this embodiment, each laminate structure contains an outer score line 52 in the outer film layer (optionally, precision overcut after lamination) and an inner score line 62 (optionally, precision undercut after lamination) in the inner film layer. Each structure additionally comprises a tab 23. The outermost edge of tab 23, in an embodiment, may not be within the boundaries of the laminate (see edge of the packaging structure 24). In other embodiments, the outermost edge of tab 23 aligns with the edge 24 of the packaging structure. In an embodiment, at least a portion of the tab 23, is positioned within the heat seal area of the laminate. In an embodiment, the entirety of the tab 23 is positioned within the heat seal area of the laminate.

Presenting the tab 23 within the heat seal area of the package provides many advantages. As one example, the tab 23 can be accessed more easily in this configuration. Rather than searching the top or front surface of the package, a consumer immediately knows where to look for and access the tab 23. Because the tab 23 is aligned with the edge of the package, it can be identified, accessed, and lifted away from the package with ease, reducing customer frustrations. In addition, the laminate and packaging structures discussed herein have a lower cost of manufacture because the cutting/scoring process is less complicated and less waste is created in the manufacturing process. By aligning the edge of the tab with the laminate edge or along the cut line of the heat seal, an additional cut or angle need not be contemplated. A single cut (or no cut at all in the case of a tab aligned with a laminate edge) will suffice. Additionally, the waste created between the edge of the tab and the laminate boundaries may be reduced or eliminated.

The packages described above are formed by completely enveloping the contents in the flexible laminate. Alternatively, however, it is within the scope of the invention to employ the flexible laminate as a lidding stock for forming flexible lids that can be secured (e.g., by heat-sealing or the like) to a flange of a tray or other container that contains the contents. In this manner, the lid includes a built-in opening and reclose feature as previously described.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A flexible laminate comprising:
   an outer structure;
   an inner structure;
   a pressure sensitive adhesive layer adhesively joining the outer structure and the inner structure to form a laminate, wherein the laminate has an opening end and a base end and a longitudinal direction which runs between the opening end and the base end;
   at least one outer line of weakness formed in the outer structure, the at least one outer line of weakness defining part of an outer opening portion that is separable from the outer structure along the at least one outer line of weakness, wherein the at least one outer line of weakness terminates in at least one tear receiving element adjacent the opening end of the laminate;
   at least one first inner line of weakness formed in the inner structure, the first inner line of weakness defining an inner opening portion that is separable from the inner structure along the first inner line of weakness, wherein:
      the inner opening portion is joined to the outer opening portion such that lifting the outer opening portion out of the plane of the flexible laminate causes the inner opening portion to be lifted along with the outer opening portion so as to create an opening through the flexible laminate; and
      a marginal region of the outer opening portion is defined between the inner and outer lines of weakness, the marginal region overlying an underlying surface of the inner structure;
   a tab defined by at least one line of weakness formed through both the outer structure and the inner structure, wherein the at least one tab-defining line of weakness terminates adjacent the opening end of the laminate in at least one tear propagating element; and
   a second inner line of weakness formed in the inner structure, wherein the second inner line of weakness is disposed between the at least one tear propagating element of the tab and the at least one tear receiving element of the at least one outer line of weakness,
   wherein each of the tear receiving elements of the outer lines of weakness adjacent the opening end of the laminate comprise an apex and an arm and the arm is substantially perpendicular to the longitudinal direction of the laminate.

2. The laminate of claim 1 wherein the at least one outer line of weakness comprises two outer lines of weakness, each of which terminates in a tear receiving element adjacent the opening end of the laminate and each of which terminates in a tear restricting element adjacent the base end of the laminate.

3. The laminate of claim 2 wherein each of the two outer lines of weakness is discontinuous with any other lines of weakness.

4. The laminate of claim 2 wherein each of the tear receiving elements comprises a j-hook.

5. The laminate of claim 1 wherein the at least one line of weakness of the tab comprises two lines of weakness, each of which initiates at the edge of the laminate and terminates in a tear propagating element, and wherein each of the tear propagating elements of the tab comprise an apex and an arm and the apex is directed toward the respective arm of the tear receiving element of the outer lines of weakness adjacent the opening end of the laminate.

6. The laminate of claim 5 wherein each of the tear propagating elements comprises a j-hook.

7. The laminate of claim 5 wherein the tear propagating elements of the tab and the tear receiving elements of the outer lines of weakness adjacent the opening end of the laminate comprise tamper evidence features.

8. The laminate of claim 1 wherein the at least one line of weakness of the tab comprises two lines of weakness, each of which initiates at the edge of the laminate and terminates in j-hooks.

9. The laminate of claim 8 wherein each of the two lines of weakness of the tab is discontinuous with any other lines of weakness.

10. The laminate of claim 1 wherein the pressure sensitive adhesive is disposed throughout the laminate structure.

11. The laminate of claim 1 wherein second inner line of weakness is generally perpendicular to the longitudinal direction of the laminate through a central portion of the second inner line of weakness and curves toward the tab near its opposite ends.

12. The laminate of claim 1 wherein second inner line of weakness comprises a curved line of weakness which is concave toward the tab.

13. The laminate of claim 1 wherein the laminate forms a flexible package.

14. The laminate of claim 13, wherein the package comprises a stand-up pouch or a flow-wrap structure.

15. The laminate of claim 1 wherein the outer structure and the inner structure comprise polyethylene terephthalate.

16. The laminate of claim 1 wherein the outer structure comprises polyethylene terephthalate and the inner structure comprises low density polyethylene.

17. The laminate of claim 1 wherein the outer structure comprises polyethylene terephthalate and the inner structure comprises oriented polypropylene.

18. The laminate of claim 1 wherein the tab and the at least one outer line of weakness are discontinuous.

19. A flexible laminate comprising:
an outer structure;
an inner structure;
a pressure sensitive adhesive layer adhesively joining the outer structure and the inner structure to form a laminate, wherein the laminate has an opening end and a base end and a longitudinal direction which runs between the opening end and the base end;
at least one outer line of weakness formed in the outer structure, the at least one outer line of weakness defining part of an outer opening portion that is separable from the outer structure along the at least one outer line of weakness, wherein the at least one outer line of weakness terminates in at least one tear receiving element adjacent the opening end of the laminate;
at least one first inner line of weakness formed in the inner structure, the first inner line of weakness defining an inner opening portion that is separable from the inner structure along the first inner line of weakness, wherein:
the inner opening portion is joined to the outer opening portion such that lifting the outer opening portion out of the plane of the flexible laminate causes the inner opening portion to be lifted along with the outer opening portion so as to create an opening through the flexible laminate; and
a marginal region of the outer opening portion is defined between the inner and outer lines of weakness, the marginal region overlying an underlying surface of the inner structure;
a tab defined by at least one line of weakness formed through both the outer structure and the inner structure, wherein the at least one tab-defining line of weakness terminates adjacent the opening end of the laminate in at least one tear propagating element; and
a second inner line of weakness formed in the inner structure, wherein the second inner line of weakness is disposed between the at least one tear propagating element of the tab and the at least one tear receiving element of the at least one outer line of weakness, wherein the second inner line of weakness has a central portion disposed adjacent a central portion of the tab and two outwardly extending ends and wherein:
a first end of the second inner line of weakness extends outwardly beyond a first arm of the tear propagating element of the tab and beyond a first arm of the tear receiving element of the outer lines of weakness adjacent the opening end of the laminate; and
a second end of the second inner line of weakness extends beyond a second arm of the tear propagating element of the tab and beyond a second arm of the tear receiving element of the outer lines of weakness adjacent the opening end of the laminate.

20. A method of making a flexible package comprising:
providing an outer structure;
providing an inner structure;
adhesively joining the outer structure and the inner structure using a pressure sensitive adhesive to form a laminate, wherein the laminate has an opening end and a base end and a longitudinal direction which runs between the opening end and the base end;
scoring at least one outer line of weakness in the outer structure, the at least one outer line of weakness defining part of an outer opening portion that is separable from the outer structure along the at least one outer line of weakness, wherein the at least one outer line of weakness terminates in at least one tear receiving element adjacent the opening end of the laminate;
scoring a first inner line of weakness formed in the inner structure, the first inner line of weakness defining an inner opening portion that is separable from the inner structure along the first inner line of weakness, wherein:
the inner opening portion is joined to the outer opening portion such that lifting the outer opening portion out of the plane of the flexible packaging structure causes the inner opening portion to be lifted along with the outer opening portion so as to create an opening through the flexible packaging structure; and
a marginal region of the outer opening portion is defined between the inner and outer lines of weakness, the marginal region overlying an underlying surface of the inner structure;
scoring at least one line of weakness through both the outer structure and the inner structure to form a tab, wherein the at least one outer line of weakness terminates in at least one tear propagating element;
scoring a second inner line of weakness in the inner structure, wherein the second inner line of weakness is disposed between the at least one tear propagating element of the tab and the at least one tear receiving element of the at least one outer line of weakness, wherein each of the tear receiving elements of the outer lines of weakness adjacent the opening end of the laminate comprise an apex and an arm and the arm is substantially perpendicular to the longitudinal direction of the laminate; and
forming the scored laminate into a packaging structure having a first sidewall comprising the tab and a second sidewall, wherein the tab is disposed within an end seal region of the first sidewall; and
end sealing the first sidewall to the second sidewall such that the tab remains unadhered to the second sidewall.

21. The method of claim 20 wherein the end sealing comprises heat sealing.

22. The method of claim 21, wherein heat sealing is accomplished using a heat seal tool having a recess which surrounds the at least one line of weakness which forms the tab.

23. The method of claim 20 wherein an edge of the tab is aligned with an edge of the packaging structure.

24. The method of claim 20 wherein the tab and the at least one outer line of weakness are discontinuous prior to opening the packaging structure.

* * * * *